US012774695B2

(12) United States Patent
Church

(10) Patent No.: US 12,774,695 B2
(45) Date of Patent: Oct. 27, 2026

(54) STRUCTURE AND METHOD FOR A FLEXIBLE TRAILING EDGE PROJECTION OF AN AIRFOIL

(71) Applicant: BIOMERENEWABLES INC., Toronto (CA)

(72) Inventor: Ryan Church, Toronto (CA)

(73) Assignee: BIOMERENEWABLES INC., Toronto (CA)

( * ) Notice: Subject to any disclaimer, the term of this patent is extended or adjusted under 35 U.S.C. 154(b) by 0 days.

(21) Appl. No.: 19/371,806

(22) Filed: Oct. 28, 2025

(65) Prior Publication Data

US 2026/0194038 A1 Jul. 9, 2026

Related U.S. Application Data

(63) Continuation-in-part of application No. 19/012,286, filed on Jan. 7, 2025, now Pat. No. 12,480,404.

(60) Provisional application No. 63/776,244, filed on Mar. 23, 2025.

(51) Int. Cl.
*F03D 1/06* (2006.01)

(52) U.S. Cl.
CPC ......... *F03D 1/0648* (2023.08); *F03D 1/0645* (2023.08); *F05B 2240/3042* (2020.08)

(58) Field of Classification Search
CPC ...... F01D 5/141; F03D 1/0648; F03D 1/0645; F03D 1/0633; F03D 1/0675
See application file for complete search history.

(56) References Cited

U.S. PATENT DOCUMENTS 10,138,868 B2 11/2018 Altmikus et al.
10,612,517 B2 4/2020 Herr
10,746,157 B2 * 8/2020 Wang .................... F03D 1/0633
12,247,541 B2 3/2025 Kamruzzaman et al.

FOREIGN PATENT DOCUMENTS

EP 3121376 A1 1/2017
WO WO-2024108302 A1 * 5/2024 ........... F03D 1/0645

OTHER PUBLICATIONS

European Patent Office, Extended European Search Report, Application No. 25214798.8, dated Apr. 15, 2026.

* cited by examiner

*Primary Examiner* — Sabbir Hasan
(74) *Attorney, Agent, or Firm* — Norton Rose Fulbright Canada LLP

(57) ABSTRACT

A structure is proposed for traversing a fluid environment and reducing the interference of the fluid flow vector at a trailing edge of the structure. The structure comprises an elongate body having a root, a wingtip, a leading edge and the trailing edge. The structure has a plurality of flexible projections positioned along the trailing edge extending from a base to a tip. The plurality of flexible projections bend to conform to a curvature of the fluid flow vector at the trailing edge and have a first resonant frequency above an oscillating force generated by the fluid flow vector.

20 Claims, 12 Drawing Sheets

STRUCTURE AND METHOD FOR A FLEXIBLE TRAILING EDGE PROJECTION OF AN AIRFOIL

This application is a Continuation-in-Part of, and claims the benefit of priority to, U.S. application Ser. No. 19/012,286 filed on Jan. 7, 2025, entitled "STRUCTURE AND METHOD FOR A FLEXIBLE TRAILING EDGE SERRATION OF AN AIRFOIL". This application also claims the benefit of priority to U.S. Application No. 63/776,244 filed on Mar. 23, 2025, entitled "STRUCTURE WITH SERRATIONS ADAPTED TO TRAVERSE A FLUID ENVIRONMENT". The contents of the related applications are hereby incorporated by reference.

FIELD

Embodiments of the present disclosure relate to aerodynamic structures adapted to traverse fluid environments and more specifically, embodiments relate to aerodynamic structures used in fluid power systems containing flexible trailing edge projections.

INTRODUCTION

Aerodynamic structures, such as airfoils, are designed to traverse a fluid medium, such as air or water, and act as either a power producing device or as a power output device. When operating as a power producing device, the aerodynamic structure, is typically coupled to a generator which coverts the kinetic energy extracted from the fluid flow into electric power which can be stored and transported for consumption. When operating as a power output device, the airfoil is typically controlled by a power source which imparts rotary motion on the airfoil in order to "push" or "pull" a fluid in order to generate thrust.

With the increasing adoption of renewable energy sources to supplement and replace less environmentally friendly sources of energy, wind turbines have seen growing adoption as a power producing device. As with all aerodynamic structures, the interaction between the turbine blades and the fluid flow results in turbulence within the fluid flow leading to the generation of undesirable noise, especially when wind turbines are located proximate residential zones. A primary source of noise from a wind turbine is generated at the trailing edge of the turbine blade due to a mixture of blunt trailing edge noise, or "B-TE", and turbulent boundary layer trailing edge noise, or "TBL-TE" noise, with TBL-TE being the largest cause for rotor blade noise emissions.

As TBL-TE is caused by scattering of turbulent fluctuations within the blade boundary layer at the trailing edge, a structure and method for reducing or modifying TBL-TE noise is desirable.

SUMMARY

A flexible double rooted serration is proposed which is capable of conforming to the curvature of the natural flow vector at the trailing edge of the turbine blade, thereby reducing the interference between the flow vector and the projection, and by spreading out the mixing of the air over a larger area, and prevent the turbulent nature of the mixing to occur all at once in one location.

As an object traverses a fluid medium, the interaction between the surface of the object and the fluid flow causes noise as a result of the interference of the natural flow vector of the fluid flow. For example, the friction generated by the boundary layer of a structure, such as an airfoil or blade, traversing a fluid may lead to the onset of turbulent flow and a corresponding noise as a result of the turbulence. Some of this undesirable noise resulting from a structure traversing a fluid can be attenuated through the use of projections extending from a trailing edge of the structure which target specific frequencies for destructive interference or modification by delaying the onset of mixing. However, these projections can cause undesirable turbulence which can reduce their effectiveness in operation as they resist the natural flow vector which flows from a pressure and suction side of the structure's trailing edge. As the projections are unable to conform to the natural flow vector at the trailing edge of the structure, the projections act like a rake which resists the natural flow vector and results in turbulence being generated.

The inability of the projections to conform to the natural flow vector at the trailing edge is exacerbated when these rigid projections are implemented in advanced systems which can adjust/modify the angle of attack of an airfoil or blade in response to changes in the fluid flow conditions and operational demands. As the angle of attack of the airfoil or blade is adjusted, the natural flow vector at the trailing edge will experience a corresponding adjustment which makes it difficult to design a rigid projection with a preset curvature or offset from the trailing edge which will be viable across the broad range of operating conditions which may be expected.

When considering the usage of trailing edge projections in wind turbines, the turbulence created by the projections can result in undesirable noise being produced which may reduce the strategic opportunities of a turbine farm. The trailing edge projections may also reduce the efficiency and performance of the turbine farm, both at an individual turbine and project wide level. This is due to the impact that turbulence generated by a rigid projection may have on the downstream turbines in a turbine farm. The upstream turbulence may reduce flow velocities of the working fluid (i.e. air) and this effect can be felt as far as 100 km away in certain conditions.

A flexible projection is proposed which is capable of conforming to the curvature of the natural flow vector at the trailing edge of the turbine blade, thereby reducing the interference between the flow vector and the projection. The reduction in noise that may result from the proposed flexible projection allows a turbine farm operator to run their individual turbines at more aggressive settings without running afoul of locally regulated noise thresholds. Further, as the density of a turbine farm (i.e. amount of turbines within a predefined area) may be limited by locally regulated noise thresholds, the reduced magnitude of noise generated by each individual turbine may allow a turbine farm operator to increase the density of the turbine farm. In addition to the potential increased density of the turbine farm which may result from implementation of the proposed flexible projections, wind turbines may also be located closer to residential or developed areas as the noise attenuation from the proposed flexible projections may reduce the distance which the noise can travel.

In a preferred embodiment, the flexible projections can be provided in the form of a double-peaked serration, where a first peak and a second peak can have different heights. There can be a "primary" trough established between discrete serrations, and a "secondary trough" established between the first and the second peak (e.g., at the midpoint or any another point between the first and the second peak). Each of these peaks and their corresponding geometries can be adapted to provide an improved serration that causes noise modification in respect of a target frequency or a target band of frequencies (which may also be impacted by the wind speed at a particular chordal section of a turbine).

According to this preferred embodiment, the flexible serrations operate by conforming to the fluid flow vector to reduce the interference with the air flow, and spreading out the mixing of the air over a larger area to prevent the turbulent nature of the mixing to occur all at once in one location. This dissipates the energy differentials of the two flows over a greater timespan, thus reducing the threshold for turbulent sound formation. Further, the geometry of the alternating flexible projections and troughs are such that two adjacent troughs are positioned relative to each other with different axial distances in the chord-wise direction, such that each may initiate a sound wave of a known frequency range that, when interacting with the proximate sound wave created by its neighboring trough, cancels itself out deconstructivity (e.g., with destructive interference). Due to the flexibility of the serration conforming to the fluid flow vector, the fluid flow at the trailing edge of the turbine contains less turbulence such that the dissipation of energy differentials within the troughs of the flexible serrations are further reduced.

The proposed structure is adapted to traverse a fluid environment and can be used for either power output or power producing systems. The fluid environment may be air, water, oil, vapor, or any other commonly used working fluid. The structure is comprised of an elongate body which extends along a length from a root to a wingtip. The elongate body also contains a trailing edge and leading edge which extend on opposing sides of the elongate body along the length from the root and wingtip.

Along the length of the elongate body, a plurality of flexible projections are coupled to the trailing edge at a respective position. The plurality of flexible projections extend from a base, which is coupled to a surface on the trailing edge of the elongate body, to a tip. The distance between the base and tip of the flexible projection defines a projection length.

The elongate body has a pressure and suction side which extend on opposing sides of the elongate body along the chord length of the elongate body from the leading edge to the trailing edge.

The elongate body may have a camber relative to the pressure and suction side, the camber will impart a pressure gradient on the fluid traversing the elongate body which will generate a local median air pressure vector arc at the trailing edge where the flow along the suction and pressure side of the elongate body meets. The plurality of flexible projections bend to conform to the local median air pressure vector arc at the trailing edge thereby reducing the interference on the fluid flow. The structural characteristics of the flexible projections may be designed to be capable of bending to conform to the local median air pressure vector between a pressure gradient of 1-20 MPa. Further, the plurality of flexible projections have a first resonant frequency above an oscillating force generated by the local median air pressure vector.

In a further embodiment, the first resonant frequency of the plurality of flexible projections does not overlap with the natural frequencies (harmonics) of the elongate body. In order to modify the natural frequency of the plurality of flexible projections, structural characteristics such as a stiffness value, a material selection, the length from the base to tip, and the geometry of the flexible projection may be adjusted.

In some embodiments, the flexible projection has a shore D hardness rating between 10-70.

In some embodiments, the flexible projection has a flexural strength between 100-500 MPa.

In some embodiments, the length of the trailing edge of the elongate body may be separated into sections of flexible projections, wherein each section extends a distinct length of the trailing edge. The flexible projections within each section have at least a uniform length, stiffness, material composition and/or geometry, and adjacent sections of flexible projections may have different specifications for the above structure characteristics.

In some embodiments, the flexible projections gradually decrease or increase in length along the length of the trailing edge, such that each flexible projection is either slightly longer or shorter than the adjacent flexible projection. In a further embodiment, the flexible projection is composed of at least two material sections each extending along a portion of the length of the flexible projection, each material section containing a difference material composition than an adjacent material section.

In some embodiments, the length of the plurality of flexible projections are 5%-30% of the chord length, and in a preferred embodiment, 10-25% of the chord length, and in a more preferred embodiment, 18%-20% of the chord length.

In some embodiments, the flexible projection may extend from the trailing edge of the elongate body with an offset angle relative to the base of the flexible projection (i.e. relative to the surface of the trailing edge). The offset angle may be between (+/−) 0.5 degrees and (+/−) 10 degrees.

The flexible projections may be coupled to the trailing edge of the elongate body either as a retro-fit or at the time of manufacture/installation of the elongate body. When coupled as a retro-fit, the flexible projection may be attached to an exterior surface of the elongate body on either the pressure or suction side. Coupling may occur through any one or more of a mechanical fastener, an adhesive, chemical bonding or a weld.

In some embodiments, the flexible projections may be integrated into the elongate body at the trailing edge, such as within a cavity running along the length of the trailing edge. When integrated into the trailing edge, the plurality of flexible projections may be secured through any one of an adhesive, a mechanical fasteners, a chemical bond, a tolerance fitting or a weld.

The flexible projections, depending on financial and tolerance constraints, may be an article of manufacture through any one of casting, 3D printing, laser or water jet cutting and injection moulding. The flexible projections can be manufactured to be a broad range of geometric shapes, including but not limited to, a saw tooth, protruding rectangle, frills, double-edged serration, comb/brush teeth, riblet, fluting or fimbriae.

The elongate body may be integrated into a larger system for either power production or power output. In some embodiments, the elongate structure is part of an airfoil mounted to at least a wind turbine, a tidal turbine, an aircraft wing, a drone rotor or a seacraft.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
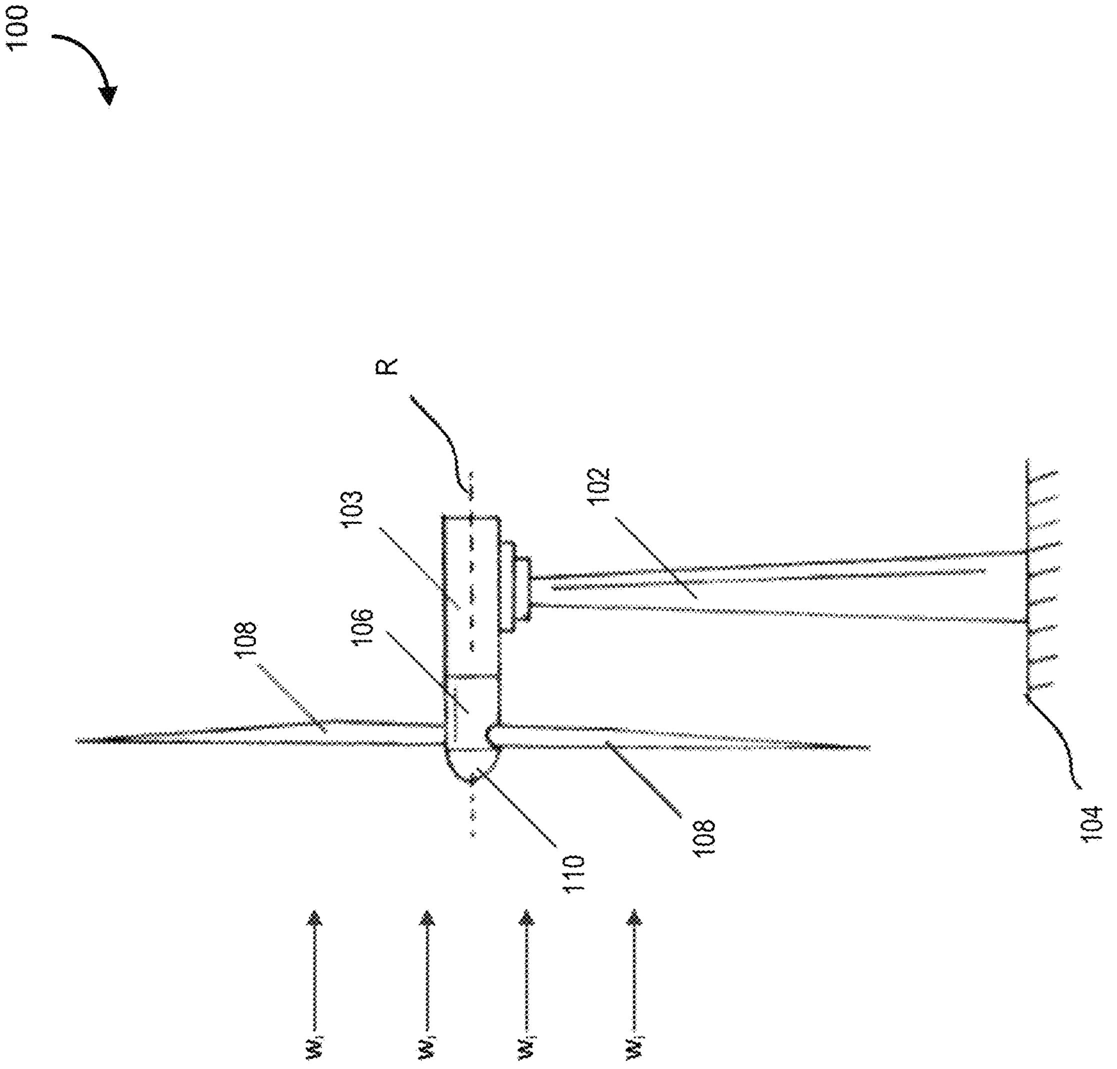
FIG. 1 is a side elevation view of a horizontal axis wind turbine, according to the prior art.

As an object traverses a fluid medium, the interaction between the surface of the object and the fluid flow causes noise as a result of the interference of the natural flow vector of the fluid flow. For example, the friction generated by the boundary layer of a structure, such as an airfoil or blade, traversing a fluid may lead to the onset of turbulent flow and a corresponding noise as a result of the turbulence. Some of this undesirable noise resulting from a structure traversing a fluid can be attenuated through the use of projections extending from a trailing edge of the structure which target specific frequencies for destructive interference or modification by delaying the onset of mixing. However, these projections can cause undesirable turbulence which can reduce their effectiveness in operation as they resist the natural flow vector which flows from a pressure and suction side of the structure's trailing edge. As the projections are unable to conform to the natural flow vector at the trailing edge of the structure, the projections act like a rake which resists the natural flow vector and results in turbulence being generated.

The inability of the projections to conform to the natural flow vector at the trailing edge is exacerbated when these rigid projections are implemented in advanced systems which can adjust/modify the angle of attack of an airfoil or blade in response to changes in the fluid flow conditions and operational demands. As the angle of attack of the airfoil or blade is adjusted, the natural flow vector at the trailing edge will experience a corresponding adjustment which makes it difficult to design a rigid projection with a preset curvature or offset from the trailing edge which will be viable across the broad range of operating conditions which may be expected.

When considering the usage of trailing edge projections in wind turbines, the turbulence created by the projections can result in undesirable noise being produced which may reduce the strategic opportunities of a turbine farm. The trailing edge projections may also reduce the efficiency and performance of the turbine farm, both at an individual turbine and project wide level. This is due to the impact that turbulence generated by a rigid projection may have on the downstream turbines in a turbine farm. The upstream turbulence may reduce flow velocities of the working fluid (i.e. air) and this effect can be felt as far as 100 km away in certain conditions.

A flexible projection is proposed which is capable of conforming to the curvature of the natural flow vector at the trailing edge of the turbine blade, thereby reducing the interference between the flow vector and the projection. The reduction in noise that may result from the proposed flexible projection allows a turbine farm operator to run their individual turbines at more aggressive settings without running afoul of locally regulated noise thresholds. Further, as the density of a turbine farm (i.e. amount of turbines within a predefined area) may be limited by locally regulated noise thresholds, the reduced magnitude of noise generated by each individual turbine may allow a turbine farm operator to increase the density of the turbine farm. In addition to the potential increased density of the turbine farm which may result from implementation of the proposed flexible projections, wind turbines may also be located closer to residential or developed areas as the noise attenuation from the proposed flexible projections may reduce the distance which the noise can travel.

A further benefit of the proposed flexible projection is that the reduction in turbulence achieved by the flexible projections conforming to the flow vector at the trailing edge increases the flow velocity which can be extracted by the downstream turbines. The increased flow velocity may result in not only increased profitability of each individual downstream turbine, but may also allow a higher density of turbines to viably operate within a pre-defined area.

In some embodiments, the proposed flexible projections can be implemented as a retro-fit for existing wind turbines which may result in increasing profitability and efficiency of existing projects. For example, the proposed flexible projections may be coupled to an exterior surface of the trailing edge of the turbine blade through the use of an adhesive, mechanical fastener, chemical bonding or weld. In another embodiment, the proposed flexible projections may be implemented prior to installation of the turbine blade. For example, the flexible projection may be integrated into the internal structure of the trailing edge of the turbine blade or coupled to an exterior surface of the trailing edge.

FIG. 1 is a side elevation view of a horizontal axis wind turbine 100. Turbine 100 includes a tower 102 supported by and extending from a surface 104, such as a ground surface. Supported by tower 102, in turn, is a nacelle 103 extending horizontally. A hub with a spinner 106 is rotatably mounted at a front end of nacelle 103 and is rotatable with respect to nacelle 103 about rotation axis R. Spinner 106 receives and supports multiple horizontal-axis rotor blades 108 that each extend outwardly from spinner 106. Rotor blades 108 catch incident wind $W_i$ flowing towards the turbine 100 causing the blades 108 to rotate. Since the blades 108 are supported by spinner 106, when rotor blade 108 rotates, spinner 106 will also rotate about rotation axis R. The rotational motion of spinner 106 can be converted into usable electrical or mechanical power. In this sense, rotor blades 108 are each structures adapted to traverse a fluid environment, where the fluid in this embodiment is ambient air. Nacelle 103 may be rotatably mounted to tower 102, thereby enabling rotor blades 108 to adaptively face the direction from which incident wind $W_i$ is approaching the turbine 100. A nose cone 110 of approximately a uniform paraboloidal shape is shown mounted to a front end of spinner 106 to deflect incident wind $W_i$ away from spinner 106.

Figure 2:
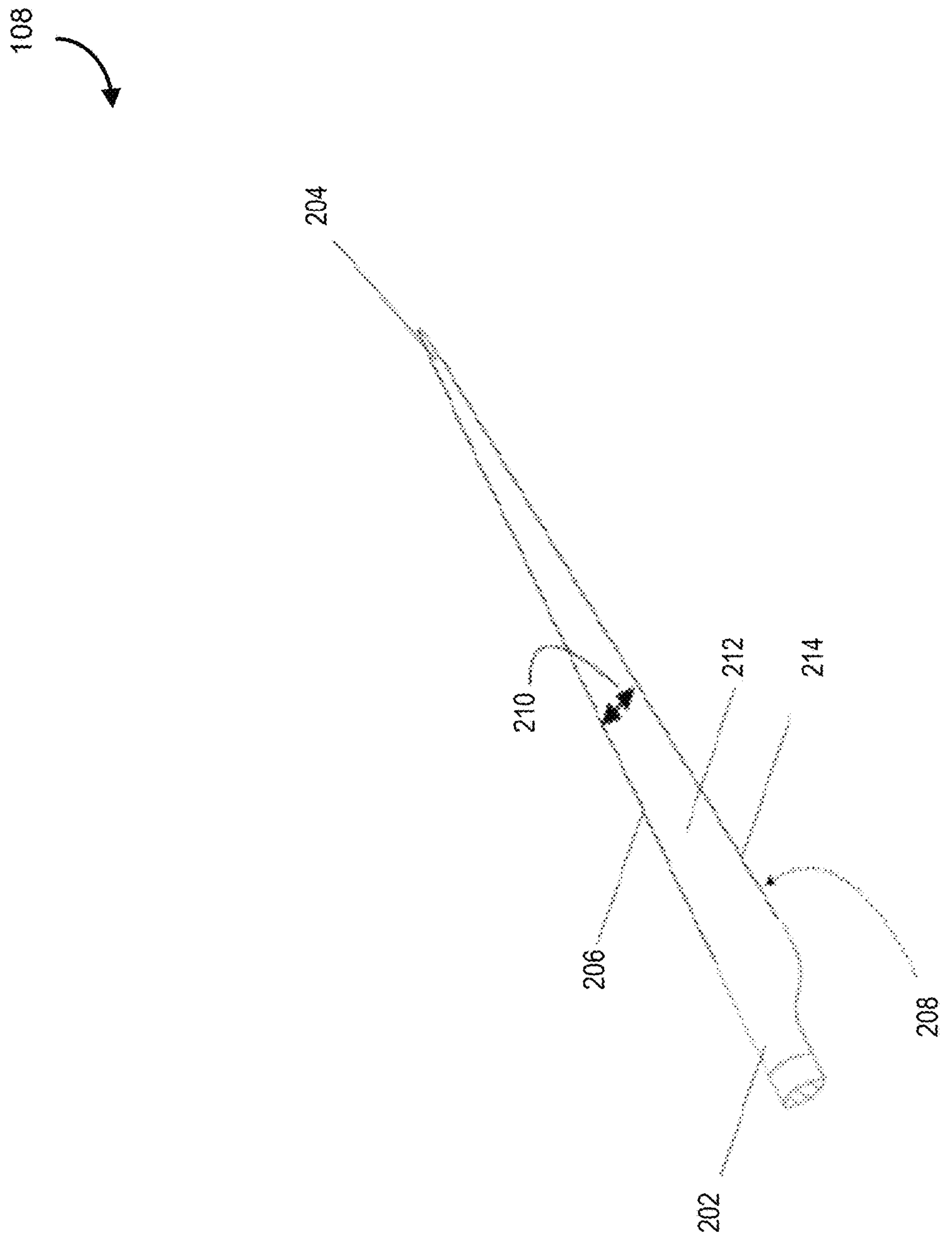
FIG. 2 is a side perspective view of a blade in the horizontal axis wind turbine shown in FIG. 1.

FIG. 2 is a side perspective of one of the horizontal axis rotor blades 108. Blade 108 includes an elongate body having a length L that extends from a root 202 to a tip 204. The elongate body has a leading edge 206 and a trailing edge 208, where the leading edge 206 passes through the air before the trailing edge 108 when the blade 108 is in motion. Here, the leading edge 206 and the trailing edge 208 are separated from each other along a chord length 210. The chord length 210 is at a maximum near the root 202 of the blade 108, and progressively decreases in size until reaching the tip 204 of the blade 108. A pressure side 212 of the elongate body is shown here, and a suction side 214 is opposite the pressure side 212 of the elongate body of the blade 108. In a current approach, without any structures along the trailing edge 208, wind moving along the suction side 214 and pressure side 212 of the elongate body of the blade 108 meets abruptly at the trailing edge 208 creating turbulence and noise. The wind moving along the suction side 214 and the wind moving along the pressure side 212 may have different flow parameters (e.g. flow velocity) and may converge and mix at the trailing edge 208 thereby creating turbulence and a resulting noise.

FIG. 3A is an overhead view and enlarged view of a proposed device 300 comprising the blade 108 and a flexible structure 200 fitted onto the blade 108, the flexible structure 200 containing a plurality of flexible projections 302. As depicted, structure 200 may be geospatially apportioned into a plurality of sections 200A-200F that each extend along a portion of trailing edge 208 of blade 108. In some embodiments, the geometry of the flexible projections 302 in a given section 200A-200F may be the same as the geometry of the flexible projections 302 contained in the other sections 200A-200F. In another embodiment, the geometry of the flexible projections 302 in a given section 200A-200F may be different than the geometry of the flexible projections 302 contained in the other sections 200A-200F. For example, as depicted in FIG. 3A, the geometry of flexible projection 302A in section 200B is different than the geometry of flexible projection 302H in section 200A.

The flexible projections 302 contained in each section 200A-200F may have variations in their elasticity as compared to the flexible projections 302 in other sections 200A-200F. It would be understood that flexibility of the flexible projection 302 is determined by the stiffness/rigidity of the projection 302 (i.e. the ability of the projection 302 to resist deformation). Therefore, through selection of mechanical properties including but not limited to material, thickness, length and stiffness values of the flexible projection 302, varying performance characteristics of the flexible projections 302 can be achieved for each of sections 200A-200F.

In some embodiments, the flexible projections 302 closer to the tip 204 will be less flexible (i.e. stiffer) than the flexible projections 302 closer to the root 202. For example, flexible projection 302A may be less flexible than flexible projection 302H. This is due to the variance in velocity experienced by the flexible projections 302 along the length of blade 108. The flexible projections 302 near the tip 204 will be travelling at a higher velocity, and therefore experience a greater force vector from the air flow, relative to the flexible projections 302 near the root 202 due to the difference in tangential velocity along the blade 108 length. Due to the increased force vector experienced by the flexible projections 302 near the tip 204, it may be beneficial to have an increased stiffness relative to the flexible projections 302 nearer to the root 202 to ensure that the flexible projections 302 are able to resist vibrating forces generated by the air flow vector.

It should be understood that the arrangement of sections 200A-200F is only exemplary, and that flexible structure 200 may be arranged to have a different number of sections containing a different number of flexible projections 302. In some embodiments, flexible structure 200 may be retrofitted onto or coupled to blade 108 such that it is fastened or attached to an exterior surface of blade 108. For example, mechanical fasteners, adhesive, chemical bonding and welding may be used for securing the flexible structure 200 to the exterior of the blade 108. In another embodiment, flexible structure 200 may be integrally formed with blade 108. For example, flexible structure 200 may be inserted into a slot along the trailing edge 208 of blade 108 on either of the suction side 214 or pressure side 212. This method may be preferred when implementing the flexible structure 200 into the blade 108 during manufacturing. The flexible structure 200, upon being inserted into the slot along the trailing edge 208, can be held in place through mechanical fastening or adhesives to reinforce the coupling of the flexible structure 200 to the blade 108. Regardless of what method is used to couple the flexible structure 200 to the trailing edge 208 of the blade 108, it is preferred that the coupling mechanism interferes with the flow of air along the surface of the blade 108 as little as possible. Chamfering or bevelling may be used to provide a smooth transition from the trailing edge 208 to the surface of the flexible structure 200.

It would be further understood that flexible structure sections 200A-200F may be coupled to one another through adhesive, mechanical fasteners or chemical bonding. The ends of each of sections 200A-200F may be coupled to the adjacent sections to provide further strength to the flexible structure 200. Each section 200A-200F within flexible structure 200 may be fitted together through a series of protrusions and slots which may provide a seamless transition between each section 200A-200F to reduce the disturbance caused to the airflow as it travels across the surface of structure 200.

Figure 4:
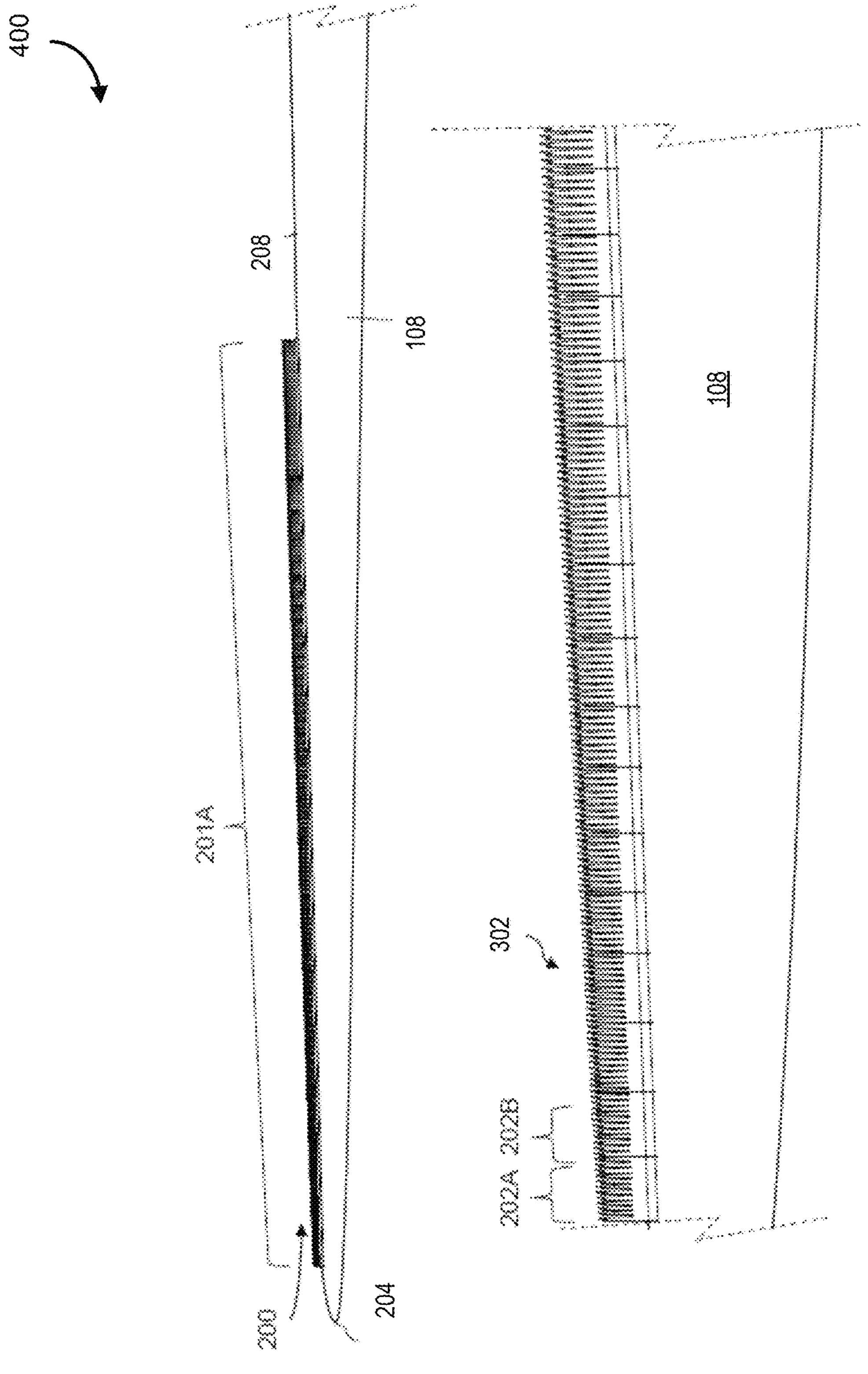
FIG. 4 is a side view of the blade of FIG. 2 and a flexible structure fitted onto the blade having flexible projections with gradually varying structural properties, according to some embodiments.

FIG. 4 is an overhead view and enlarged view of flexible structure 200 fitted onto blade 108 in a proposed system 400. As depicted, flexible structure 200 may be geospatially apportioned into a flexible structure 201A continuously increasing in length or stiffness starting from the tip 204 that extends along a portion of trailing edge 208 of blade 108. The structure 201A may be further broken up into a variety of segments such as 202A-202B, as an example, such that each of the flexible projections 302 are progressively altering in height with respect to its neighboring projection. Such a configuration may be beneficial when targeting numerous frequencies of interest, or when maximal noise reduction is desired in place of manufacturing complexity. The manufacturing complexity is higher in such a construction, as each of the segments 202A-202B must be customized to apply to a specific airfoil section along the blade 108. Such a situation may arise if a turbine manufacturer wanted to created a designated "low noise" turbine blade for a specific market.

Figure 3:
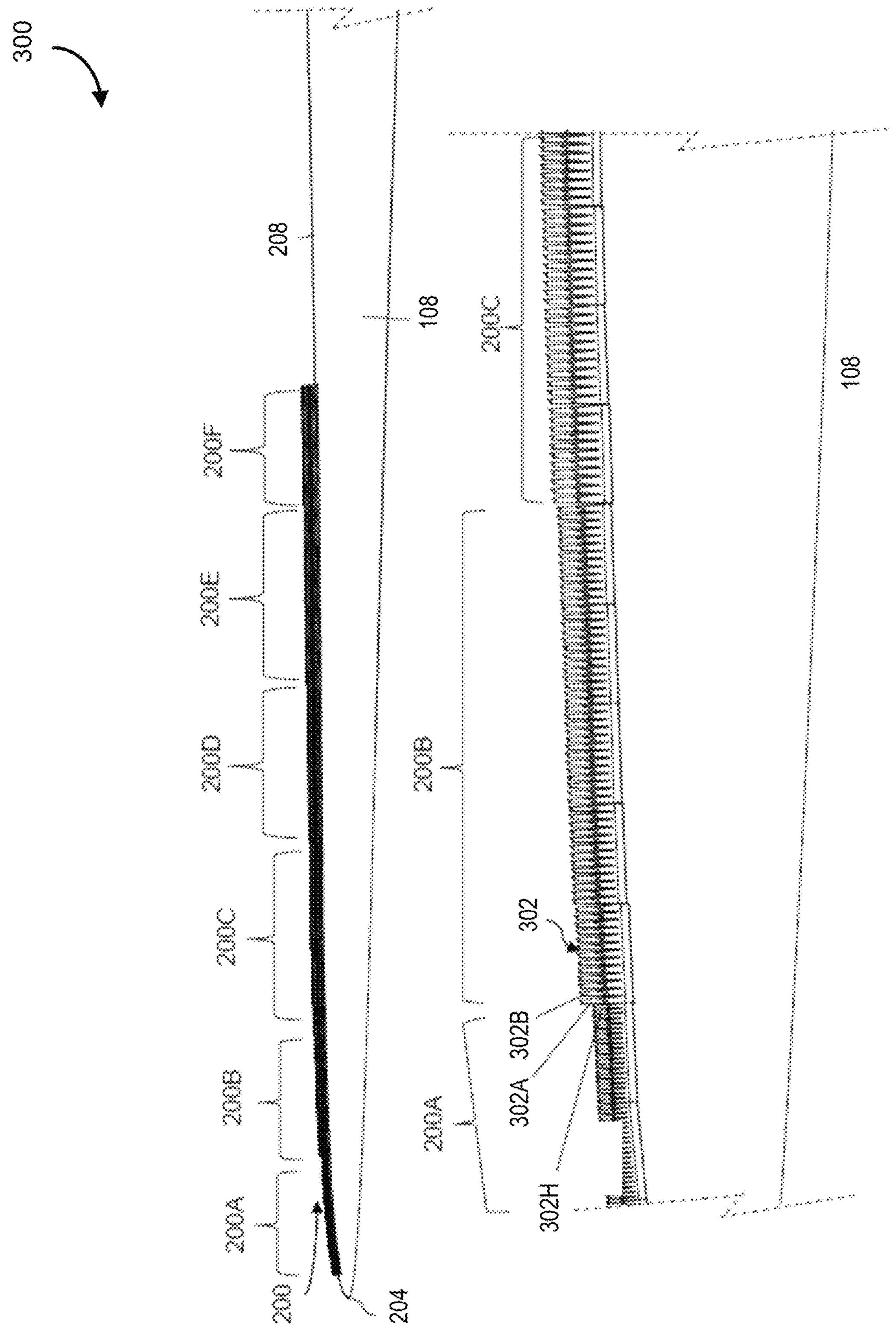
FIG. 3 is a side view of the blade of FIG. 2 and a flexible structure fitted onto the blade having flexible projections with varying structural properties, according to some embodiments.

Similar to the discussion for FIG. 3, the flexible projections 302 may have progressively altering stiffnesses with respect to its neighboring projection. The stiffness of the flexible projections 302 may gradually reduce as the flexible projections become further from the tip 204 of the blade 108 such that the elastic reaction of the flexible projections 302 to the varying tangential velocities across the length of the blade 108 are relatively similar.

When designing a configuration of flexible projections 302 within flexible structure 200, cost and operational performance factors may need to be balanced. In scenarios where a wind turbine 100 may be located proximate to residential or high density areas, a configuration which precisely targets certain frequency ranges by having a gradual variance in flexibility of the flexible projections 302 (such as in FIG. 4) along the length of the blade 108 may be desired even though it may increase cost and installation complexity due to the requirement to manufacture each individual (or small grouping of) flexible projection(s) 302 to a specific desired stiffness. When a wind turbine 100 is located in rural locations, it may be desirable to use a simpler configuration of flexible projections which are more cost efficient and have lower installation complexity. For example, sections 200A-200F may break up the trailing edge 208 into discrete sections having identical flexible projections 302 which can be sized based on the degree of noise reduction that is desired. As would be understood, by using larger, and fewer, sections 200A-200F, the cost and complexity of installation would be reduced as each flexible projection 302 does not need to be individually configured at a corresponding location along the trailing edge 208. In this case, it may be desirable to create a series of alternating sections 200A-200F of a plurality of flexible projections 302, as the rotor blade 108 would be customized for such a low-noise market application, as mass-production would be warranted. In such an example, the series of alternating segments 200A-200F could be designed to knockout frequencies in the range of 200 Hz at the proximity closer to the axis of rotation R and the frequencies in the range of 800 Hz at the proximity closer to the blade tip 204. In this case, the projection length would be set at 23% of the local chord length 210 in an optimized setup to knock out 200 Hz and 17% of the local chord length 210 in an optimized setup to knockout 800 Hz.

A broad range of manufacturing processes are available for forming the flexible projections 302, including casting, 3D printing, laser or water jet cutting and injection moulding. However, when precision may be especially desirable, such as when the flexible projections 302 will be used for a turbine 100 located proximate residential areas, additive manufacturing approaches which are highly controlled, such as 3D printing, may be preferred in order to ensure performance of the flexible projections 302 is not effected by manufacturing tolerances.

The flexible projections 302 are designed to bend during operation to conform to the local median air pressure vector arc which extends from the trailing edge 208 of the blade 108. The air pressure vector is generated in part by the unequal pressure gradient resulting from the separate flow vectors from the pressure side 212 and suction side 214 of the blade 108 meeting at the trailing edge 208. The air pressure vector may roughly follow a path starting at the tip of the trailing edge 208 and bending towards the suction side 214 of the blade 108.

The air pressure vector arc may have a different shape dependent on the airfoil and the angle of attack of that airfoil. If the flexible projection 302 is not conforming to this vector, it will create turbulence which is a source of noise and reduced aerodynamic performance. In alternative airfoil design, due in part to the camber of the airfoil, the flow across the suction side 214 of the blade will have a lower pressure vector due to the increased speed of the air flow traversing the suction side 214. The air flow across the surface of the pressure side 212 of the blade 108 will be travelling at a lower speed than the air flow across the corresponding suction side 214, and will therefore have a higher pressure vector. The relationship between fluid velocity and fluid pressure is well understood, and is essential in the formation of lift which provides the force which causes the blade 108 to rotate about the axis of rotation R (seen in FIG. 1).

The local median air pressure vector arc is dependent on the flow conditions of the blade 108, and therefore may change as operational and external conditions fluctuate. For example, the local median air pressure vector arc may be impacted by changes in the angle of attack and speed of the blade 108 during operation. The local median air pressure vector may also be impacted by changes, both sudden and gradual, in free stream air flow direction and velocity. Therefore, the flexible projections 302 may be designed to react and experience elastic deformation, across a broad range of local median air pressure vector arcs. In some embodiments, the flexible projections 302 are designed to bend in response to a pressure gradient imparted by the local median air pressure vector of 1 to 20 MPa.

Since the flexible projections 302 may only be capable of achieving increased performance and noise reduction when they conform to the local median air pressure vector arc, there may be certain considerations which must be taken into account to ensure that the flexible projections 302 do not begin to vibrate as a result of the forces imparted by the pressure gradient at the trailing edge 208 of the blade 108. Vibration of the flexible projection 302 may result in the flexible projection 302 no longer conforming to the local median air pressure vector arc and instead interfering with the natural flow of the fluid which may result in undesirable turbulence. Specifically, the flexible projections 302 should have a stiffness which, during a non-stalled fluid flow, would resist vibrating in one of its natural frequencies.

In another embodiment, the flexible projection 302 should be designed to have a first resonant frequency that is different than the harmonic frequencies of the blade 108 to which it is attached. This may protect against the flexible projection 302 vibrating with the blade 108 during operation and adversely impacting the ability of the flexible projection 302 from conforming to the local median air pressure vector arc. As the harmonic frequencies of the blade 108 may be known during either installation or manufacturing of the turbine 100, the flexible projections may be designed, through variations in their shape, thickness, material and mass of the flexible projection 302, to avoid having overlap between a natural frequency of the blade 108 and the natural frequency of the flexible projection 302. For example, the range discussed above of 1 to 20 MPa may be a typical pressure gradient experienced by a flexible projection 302 during normal operation of the wind turbine 100. Therefore, the flexible projection 302 should have a stiffness and structural properties which allows bending to conform to the local median air pressure vector arc when the pressure vector is at least 1 MPa. Further, when the pressure gradient reaches 20 MPa as a result of the local median air pressure vector, the flexible projection 302 should have a stiffness and structural properties which can maintain its ability to conform to the air flow while still resisting vibration in its natural frequency through structural and dampening characteristics of the flexible projection 302.

In a first example embodiment, the principle of operation is that the flexible projections 302 bend in response to a pressure gradient generated by the fluid flow coming off of the pressure and suction side 212, 214 meeting at the trailing edge 208, such that the technical effect is that the flexible projections 302 conform to the local median pressure vector at the trailing end 208 of the blade 108, while maintaining the structural integrity necessary to resist vibrating due to the turbulence present at the trailing edge 208. When implementing the flexible projections 302 within a turbine 100, the bending of the flexible projections 302 is controlled by at least the stiffness of the flexible projections 302 which may be determined by the mechanical properties of the flexible projections 302, such as the material composition, length, thickness and geometry. The stiffness of the flexible projections 302 has upper and lower response characteristics which correspond to the expected operating conditions of the turbine 100. For example, the flexible projections 302 are capable of bending in conformity with the local median pressure vector in response to the lowest expected pressure gradient generated at the trailing edge 208 of the blade 108, which for example, can be about 1 MPa.

The flexible projections 302 are further capable of maintaining their bending performance (i.e. conforming to the local median pressure vector) during all normal operating conditions of the turbine 100 (i.e. 1 MPa-20 MPa). The stiffness of the flexible projections 302 is further limited by the possibility of uncontrollable vibrations occurring as a result of the turbulence in the local median pressure vector at the trailing edge 208 of the blade 108. It would be understood that in order to achieve the desired principles of operation of the flexible projections 302, the flexible projections 302 are flexible enough to conform to the local median pressure vector at the trailing edge 208, but contain sufficient stiffness and dampening characteristics to resist uncontrolled vibrations as a result of turbulence which may be present at the trailing edge 208 during the maximum expected pressure gradient experienced at the trailing edge (i.e. 20 MPa). Therefore, the stiffness is partially determined by the flexible projections 302 ability to resist vibrating in its first resonant frequency while the turbine 100 is operating under normal conditions. Resistance to vibrations may be achieved through a combination of stiffness and dampening characteristics which may shift the resonant frequency and/or attenuate the resulting vibrations such that the flexible projections 302 do not resonate as a result of the turbulence present in the local median pressure vector.

In another embodiment, the flexible projection 302 has a stiffness to length ratio that is higher than the stiffness to length ratio of the blade 108. The ratio of stiffness to length will have a direct correlation to the first resonant frequency of the flexible projection 302 and blade 108 being acted upon by the fluid flow. Therefore, it may be possible to ensure that the first resonant frequency of the flexible projection 302 is above the first resonant frequency of the blade (and therefore does not have overlapping resonant frequencies) by designing the flexible projection to have a higher stiffness to length ratio than the blade 108. In a further embodiment, the flexible projection 302 may have a higher first resonant frequency than the blade 108 when the following condition is satisfied:

$$\frac{k_p}{L_p^4} > \frac{k_b}{L_b^4}$$

where $k_p$ is the stiffness of the flexible projection 302, $L_p$ is the length of the flexible projection 302, $k_p$ is the stiffness of the blade 108, and $L_b$ is the length of the blade 108. The stiffness is a measure of an objects resistance to bending, and can vary depending on the orientation which is being measured. In the present application, the stiffness along an axis parallel to the chord length of the blade 108 may be used.

As the eigenfrequencies of the blade 108 and flexible projection 302 are both inversely related to their length, and directly related to the stiffness, the condition above may be used to determine whether a flexible projection 302 will have a sufficient stiffness to length ratio such that the first resonant frequency of the flexible projection 302 is above the first resonant frequency of the blade 108. The eigenfrequency of a system, also referred to as a natural frequency, is a characteristic which is determined by the system's internal properties. Therefore, factors such as dampening do not impact the eigenfrequency of a system. However, the resonant frequency of a system is determined by both the eigenfrequency of a system and the external forces acting upon the system. Resonance occurs when there is an external force oscillating at the eigenfrequency of the system which causes an equilibrium between the forces resisting oscillations (i.e. stiffness) and the forces compounding oscillations (spring force imparted by amplitude of vibration). Therefore, a system being acted upon by an external oscillating force, such as turbulence intensity, which matches the eigenfrequency of the system, will experience vibrations at its resonance frequency.

As stiffness increases, the flexible projections 302 ability to resist bending will increase, and therefore the resonant frequency of the flexible projection 302 will be altered to a higher frequency as the oscillating force required to achieve equilibrium within the flexible projection 302 will be higher. As length increases, the flexible projection 302 will experience a force vector across a longer moment arm and therefore a larger internal force vector will be imparted onto the flexible projection by the local median air pressure vector. Further, a longer flexible projection 302 will experience a larger amplitude of vibration due to the distance of the max displacement of the tip 504 being proportional to the distance the tip 504 is from the base 502 (i.e. similar to tangential velocity during rotational motion) As a result, a longer flexible projection 302 will experience a larger oscillating force and amplitude from a Force A than a shorter flexible projection 302. The technical effect of the condition shown above is that so long as the condition is fulfilled, the flexible projection 302 may have an eigenfrequency and resonant frequency above that of the blade 108 due to the internal forces resisting oscillation represented by the stiffness being large enough in the flexible projection 302 to counteract the increased oscillation and amplitude caused by the length of the flexible projection 302.

In some embodiments, as the eigenfrequencies of the flexible projection 302 may depend on a combination of the geometry, material properties, length and mass of the flexible projection 302, these characteristics may be adjusted to set the eigenfrequencies of the flexible projection 302 above the oscillating force imparted by the local median air pressure vector during normal operation of the turbine.

The flexible projection 302 may incorporate material and structural dampening to attenuate the vibrations which may occur along the length of the flexible projections 302. For example, structural dampening may be implemented by adjusting the location of and total mass of the flexible projection 302. In some embodiments, the mass of the flexible projection 302 may be concentrated near the base 502 in order to dissipate the energy of the vibrations and reduce the amplitude. Adding mass to the flexible projection 302, specifically near the base 502 may also alter the resonant frequency of the flexible projections 302 outside a range of oscillating forces experienced during normal operation of the turbine 100. Material dampening may also be implemented through selection of the material composition of the flexible projection 302. The flexible projection 302 may be composed of one or more materials along the length of the flexible projection 302. In some embodiments, the flexible projection 302 may be separated into discrete sections which each contain a specific material composition to target dampening at the resonant frequency. For example, materials which have high dampening ratios, such as elastomers, may be used along one or more portions of the flexible projection 302 to dampen the amplitude of oscillations at the resonant frequency. For example, materials with a high dampening ratio may be primarily focused proximal to the base in order to obtain maximal dissipation of vibrational energy (i.e. where internal forces are highest). Materials with high dampening ratios may attenuate the vibrations by dissipating the vibrational energy as heat. It may also be beneficial to incorporate materials having a higher stiffness near the base 502 of the flexible projection 302 as this will provide an increased resistance to oscillation at the point along the flexible projection 302 which will experience the highest internal force vector imparted by the local median air pressure vector.

In the proposed flexible projections 302, a combination of adjusting/altering the eigenfrequency and dampening to reduce amplitude of vibrations at a resonant frequency can be implemented to achieve a technical effect of a flexible projection 302 that is capable of bending within a pressure gradient generated during normal operation of the turbine 100, but resisting vibrating at its resonance frequency. For example, the proposed solutions discussed above for altering the natural frequency of the flexible projection 302, such as ensuring that the stiffness to length ratio condition is satisfied, and that the resonant frequency is above the oscillating forces generated by the local median air pressure vector during normal operation, may be combined with structural and material dampening to ensure that any resonance that may occur will be attenuated through dissipation of the vibrational energy. As the parameters which impact natural frequency, such as stiffness and length, also impact dampening characteristics, it is possible to both alter the natural frequency and dampen the flexible projection 302 to protect against resonance or vibrations that may still occur in certain scenarios.

In some embodiments, the flexible projections 302 may satisfy the condition above such that the natural frequency of the flexible projections 302 is above the natural frequency of the blade 108. This will protect against the flexible projection 302 experiencing large amplitude vibrations as a result of the vibrations being experienced by the blade, which may have a larger force vector due to the increased length and air pressure gradient experienced by the blade 108. The stiffness and length of the flexible projection 302 may also be selected to adjust the natural frequency of the flexible projection 302 outside the oscillating forces imparted by the local median air pressure vector during normal operation of the turbine 100. Similar to the condition above, since the natural frequency of the flexible projection 302 will increase as a result of a larger stiffness value (i.e. internal force resisting bending) and decrease as a result of a larger length (i.e. increase in amplitude and bending force vector imparted by pressure gradient), geometric and material properties which increase stiffness, such as thickness, center of mass and density, may need to be increased as a result of increases in the length of the flexible projection 302.

While the approach above for altering the natural frequency may protect against the flexible projection 302 vibrating during normal operation of the turbine 100, it may be beneficial to combine the alteration of the natural frequency with structural and material dampening to ensure that if resonance does occur, the vibrations will be attenuated. As mentioned above, resonance occurs when there is equilibrium between the internal forces resisting vibrations and internal spring forces which increase vibrations, therefore when these forces are balanced, only dampening may attenuate the vibrational energy to reduce the oscillation. Therefore, in scenarios such as when extreme conditions are experienced which may be above the normal operation of the turbine, and the oscillating force reaches a magnitude which is capable of causing resonance within the flexible projection 302, dampening may be beneficial for protecting against dangerous oscillation. For a flexible projection 302 which satisfies the condition discussed above, dampening can be implemented through targeted increases in stiffness and mass in key areas along the length of the flexible projection 302. For example, the thickness, mass, material density or material stiffness may be increased proximal to the base 502 such that it is larger than the thickness, mass, material density or material stiffness proximal to the tip 504. This may result in attenuation of the vibrations at a resonant frequency as a result of the decreased amplitude of the center of mass (as a result of the center of mass being closer to the base 502) and due to an increased dissipation of vibrational energy (as a result of the increased stiffness and material dampening).

Since dampening of the flexible projection 302 will result in an increased total stiffness of the system, the flexible projection 302 will remain in compliance with the stiffness to length condition above so long as it already satisfied the condition prior to incorporation of dampening characteristics.

The technical effect of the proposed flexible projection 302 discussed above is a system which is capable of bending within the pressure gradient range experienced during normal operation, while resisting vibrations due to its resonant frequency being above the oscillating forces imparted by the local median air pressure vector. Further, due to the dampening characteristics of the flexible projection 302, if resonance does occur, the material and structural dampening will gradually reduce the amplitude of oscillations.

Figure 5:
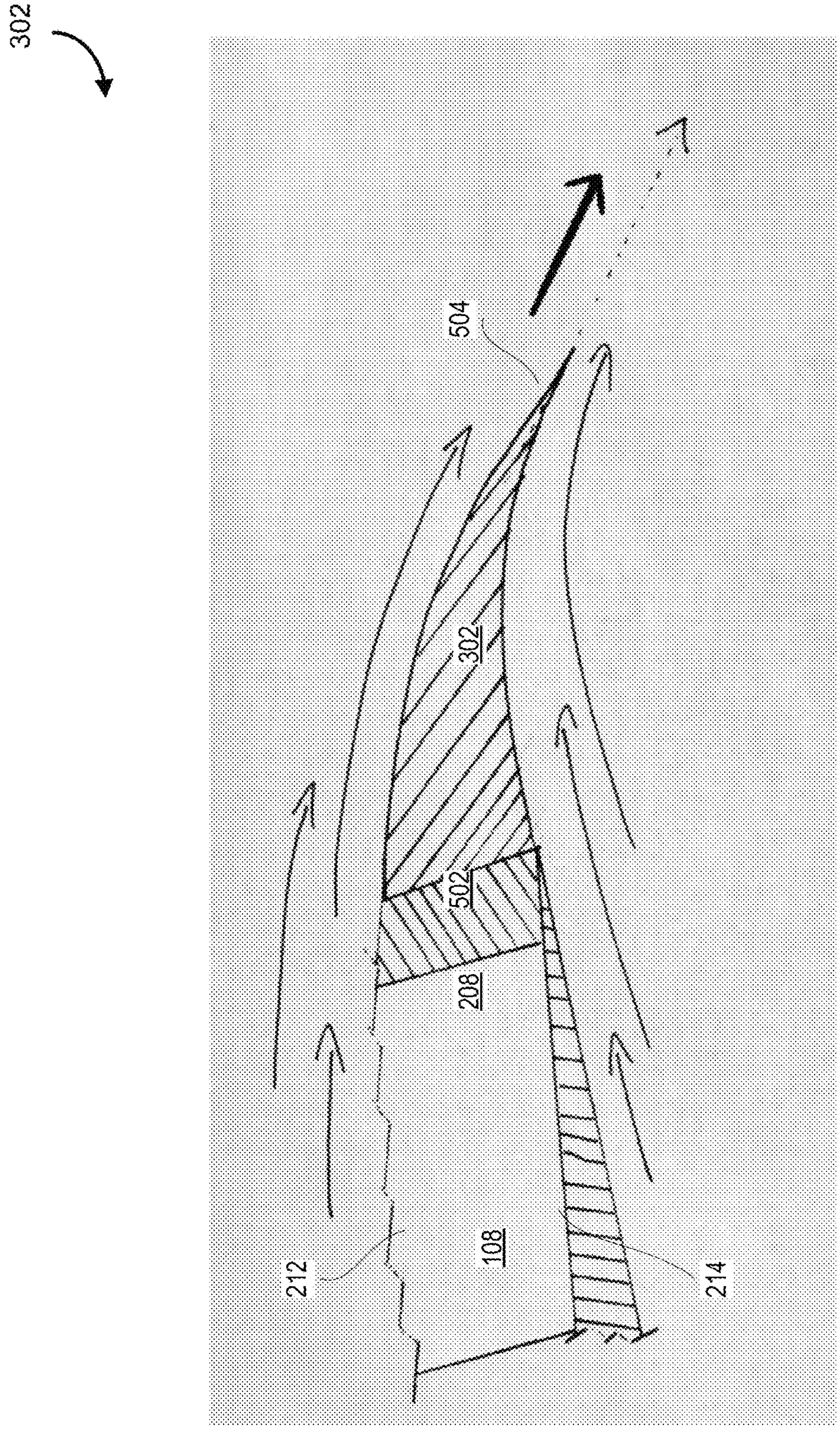
FIG. 5 is a side view of a flexible structure bending to conform to a local median air pressure vector arc, according to some embodiments.

FIG. 5 is a side view of a flexible structure bending to conform to a local median air pressure vector arc, according to some embodiments.

The flexible projection 302 contains a base 502 coupled to the trailing edge 208 of the blade 108. The flexible projection 302 extends from the base 502 to a tip 504 which extends a certain distance along the chordwise direction away from the trailing edge 208. The base 502 may be coupled to the exterior surface of the trailing edge 208 through the use of an adhesive, chemical bonding or mechanical fastener. In some embodiments, the adhesive may be double sided adhesive tape which is capable of forming an air tight seal between the flexible projection 302 and the exterior surface of the trailing edge 208. In some embodiments, the flexible projection 302 may have alignment tabs which provide graphical instructions to an installer for proper placement of the flexible projection 302 on the exterior surface of the trailing edge 208.

The flexible projection 302 may be coupled on an exterior surface on the pressure side 212 of the trailing edge 208 of the blade 108. In another embodiment, the flexible projection 302 may be coupled on an exterior surface of the suction side 214 of the trailing edge 208 of the blade 108, this may be preferred when implementing the flexible projection 302 as a retrofit for an existing turbine 100.

In another embodiment, the base 502 may be integrated into a section at or near the trailing edge 208 such that the base 502 is fitted into a slot along the length of the trailing edge 208. The base 502 may be secured within the slot through tolerance fitting, mechanical fasteners, chemical bonding or adhesives. This may be preferred when implementing the flexible projections 302 into a blade 108 of a turbine 100 at the time of manufacture.

The flexible projection 302 can take the form of varying degrees of geometric complexity so long as the geometric shape does not impact the ability of the projection to conform to the local median air pressure vector arc. As a non-limiting example, the flexible projection 302 may take the shape of anyone of a saw tooth, protruding rectangle, frills, double-edged serration, comb/brush teeth, riblet, fluting or fimbriae. In some embodiments, the flexible projection 302 forming flexible structure 200 may having varying shapes along the length of the trailing edge 208, such that adjacent projections or sections of projections may not have the same geometry. This may be desirable when targeting specific frequencies at points along the length of the trailing edge 208 of the blade 108.

The stiffness of the flexible projections 302 can be determined by the structural properties selected at the time of manufacture. The structural properties of the flexible projections 302 may include at least a material, the length of the flexible projection and a geometry of the flexible projection. The underlying objective when designing the flexible projections 302 may be to have a stiffness which allows the flexible projections 302 to conform to the local median air pressure vector arc within a range of expected operating conditions of the turbine 100. If the flexible projections 302 are too stiff, then they will not bend enough to conform to the pressure vector arc when acted upon by the force vectors coming off of the trailing edge 208. If the flexible projections 302 are too pliable, then they may either bend past the point of conforming to the pressure vector arc or begin vibrating at its natural frequencies. Vibrations at the natural frequency would occur when the oscillations of external forces, imparted by the pressure vector of the converging air flows from the pressure side 212 and suction side 214 of the blade 108, match a natural frequency (i.e. an eigenfrequency) of the flexible projection 302 and cause the flexible projection 302 to begin vibrating at a higher amplitude. The amplified vibrations experienced under the natural frequency may cause severe damage to the flexible projections 302 due to elevated material stress and material fatigue that would be experienced. The vibrations may also adversely effect the ability of the flexible projection 302 to conform to the local median air pressure vector arc at the trailing edge 208 of the blade 108.

Therefore, when designing the flexible projections 302, it may be necessary to incorporate structural and dampening characteristics through balancing the stiffness, the material selection, length and other structural properties of the flexible projections 302, to shift or reduce the impact of the natural frequency within the potential operating conditions of the turbine 100. Ideally, the flexible projection 302 is designed to have a first eigenfrequency outside the normal operating conditions of the turbine 100. In some embodiments, the flexible projection 302 is designed to shift its resonant frequency through structural dampening such that the flexible projection's 302 lowest resonant and natural frequency is outside the normal operating conditions of the turbine 100. In some embodiments, the flexible projections 302 may have a higher stiffness and thickness proximal to the tip 504 and a lower stiffness and thickness proximal to the base 502. In another embodiment, the flexible projections 302 may have a higher stiffness and thickness proximal to the base 502 and a lower stiffness and thickness proximal to the tip 504. By adjusting the thickness and stiffness along the length of the flexible projection 302, the dampening and vibration resisting properties of the flexible projection 302 may be controlled to resist vibrations at certain frequency ranges. For example, in some embodiments, the thickness and stiffness of the flexible projections 302 may be higher proximal to the base 502 in order to resist vibrating at a first resonant frequency of the blade 108. In another embodiment, the thickness and stiffness of the flexible projections 302 may be higher proximal to the base 502 in order to shift the natural frequency of the flexible projection above an oscillating force imposed by the local median air pressure vector.

In some embodiments, the flexible projection 302 may have a Shore D hardness rating between 10-70. In some embodiments, the flexural strength of the flexible projection 302 may be between 100-500 MPa.

In some embodiments, the stiffness of the flexible projections 302 can be controlled through material selection and composition. For example, polyurethane, thermoplastics, elastomers, acrylonitrile butadiene styrene, acrylonitrile styrene acrylate are all suitable options as they provide a balance between the required flexibility and durability to withstand the external working environments. It may be beneficial to modify the material composition of a flexible projection 302 through adjustments to the underlying ratio, structure and/or molecular weight in order to shift the natural frequency of the flexible projection 302 outside of the normal operating range of the turbine 100.

In some embodiments, the structure of the flexible projection 302 can be composed of two or more sections which extend distinct lengths along the total length of the flexible projection 302. Each section can have a distinct material composition which is selected to provide a desired radius of curvature and total stiffness. For example, a first section which extends from the base to the mid point of the flexible projection 302 may be composed of a material which will result in a desired curvature based on the expected local median air pressure vector arc. A second section may extend from the midpoint to the tip of the flexible projection 302 and be composed of a second material which has a different stiffness, and therefore bending profile, than the first section. For example, a stiffer material may be used near the base if the expected local median air pressure vector arc will have a gradual curvature proximal to the trailing edge. This may also be desirable as the force vectors acting on the flexible projection 302 will be highest at the base due to the cantilever beam like support layout of the flexible projection 302 will result in the internal forces acting on the base being higher than the internal forces experienced at any other location along the flexible projection 302. A more flexible material with a lower stiffness may be used near the tip in order to obtain a tight radius of curvature at the tip of the flexible projection 302. Through adjusting the number of sections along the flexible projection 302 and the material used in each section, a broad range of potential curvatures can be achieved. However, there may be cost and manufacturing complexity implications as additional sections and materials are incorporated into the flexible projection 302 design.

The length of the flexible projection 302 may also be adjusted in order to achieve a desired curvature. As mentioned before, since the flexible projection 302 acts as a cantilever beam, an increase in length will result in higher forces being experienced at the base due to the moment arm being larger. Further, an increase in length may result in a lower first resonant frequency. In some embodiments it may be necessary to have an increased length for certain flexible projections 302 since the length of the flexible projections 302 is partially based on the frequency being targeted for noise reduction. When a longer flexible projection 302 is required, the force required to trigger the first natural frequency of the flexible projection 302 can be shifted higher by increasing the mass or cross-sectional strength of the projection.

In some embodiments, the length of the flexible projections 302 may be selected to be between 5%-30% of the chord length 210 of the blade 108. In a preferred embodiment, the flexible projections 302 may be selected to be between 10-25% of the chord length 210 of the blade 108. In a most preferred embodiment, the flexible projections 302 may be selected to be between 18%-20% of the chord length 210 of the blade 108.

In some embodiments, the thickness of the flexible projections 302 may be constant along its length. In other embodiments, the thickness of the flexible projections 302 may vary such that it is thickest at its base, and thinnest at or proximal to the tip. It may be beneficial to have an increased base thickness in order to provide increased stiffness at the point at which, due to the moment arm, the internal forces are at their highest.

The combination of the material composition, length and thickness of the flexible projection 302, along with other relevant factors that may impact bending behaviour such as geometric shape and material processing approaches (melting, injecting, shaping), can be adjusted to achieve a final set of mechanical properties which ideally is able to bend to conform to the local median air pressure vector for all operation conditions of the turbine 100, without vibrating within its natural frequency. This may be achieved by counteracting the mechanical properties of the flexible projection 302 which may encourage vibrating at a first natural frequency, such as increased length or lower mass, with design choices which act to dampen or shift up the resonance frequency vibrations so that it will not result in harmful vibrations within the operating conditions of the turbine 100. For example, increased cross sectional strength may be achieved through selecting geometric shapes or varying thickness along the length of the flexible projection 302 to ensure that the center of gravity of the projection is proximal to the base of the flexible projection 302. In some embodiments, it may be desirable to reduce the length of the flexible projections 302 as they become closer to the tip 204 of the blade 108 to shift the resonance frequency higher. This may be beneficial because the external forces at the tip 204 will be higher, due to the increased tangential velocity, and therefore may be more likely to generate a higher magnitude of oscillation that could result in the flexible projection 302 vibrating at its natural frequency.

A further technical benefit of the proposed flexible projections 302 is that the effective chord length 210 of the blade 108 is extended, resulting in an increase in trailing edge camber, without imparting a proportional increase in the system's drag. This is possible due to the flexible projection 302 conforming to the local median air pressure vector so, unlike a rigid projection, it does not "rake" the air flow and generate significant drag. Therefore, the flexible projection 302 improves the lift/drag ratio of the blade 108 (i.e. the aerodynamic efficiency) due to the increased chord length 210 capturing more energy from the fluid flow without experiencing the drag penalty which is present in system's using rigid projections.

Figure 6A:
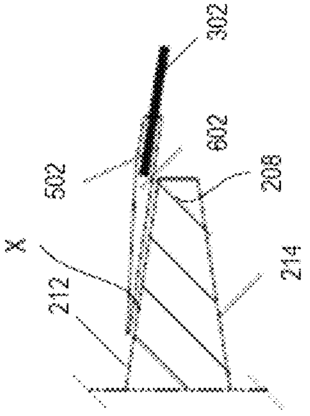
FIG. 6A is a side view of a flexible projection coupled to a trailing edge of a blade, according to some embodiments.

FIGS. 6A, 6B, 6C and 6D are side views of the flexible projection 302 coupled to the trailing edge 208 of the blade 108 at the pressure side 212, the suction side 214, and on both the pressure side and the suction sides 212, 214. In some embodiments, as depicted in FIG. 6A, an end portion 602 of base 502 of the projection 302 is chamfered between a surface X of the trailing edge 208 on a pressure side 212 until it meets with a top portion of base 502. The end section 602 may be integrally formed with the base 502 or may be bound to the top portion of the base 502.

Figure 6B:
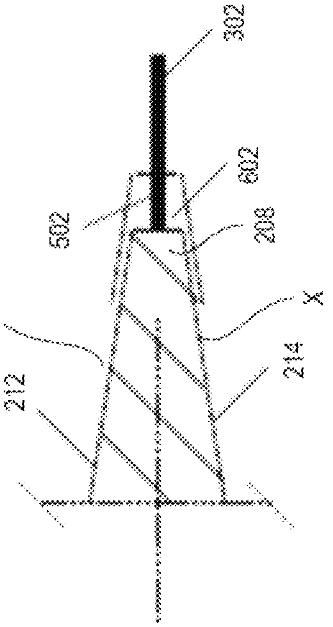
FIG. 6B is a side view of a flexible projection coupled to a trailing edge of a blade, according to some embodiments.
Figure 6C:
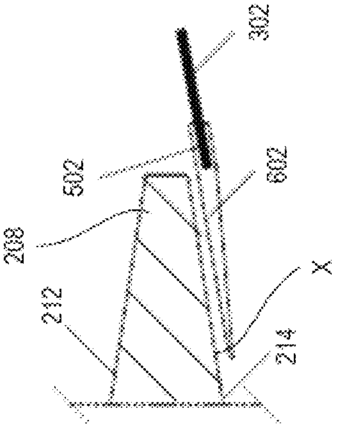
FIG. 6C is a side view of a flexible projection coupled to a trailing edge of a blade, according to some embodiments.

In another embodiment, as shown in FIG. 6B, the same structural features are shown as discussed in FIG. 6A, except that the flexible projection 302 is coupled to the suction side 214 of the blade 108. As illustrated in FIGS. 6A and 6B, base 502 may be parallel to the surface X of pressure side 212 or suction side 214. In some embodiments, end portion 602 of base 502 may attach to both a pressure side 212 and suction side 214, enabling the base section 502 to be parallel to the chord length 210. In another embodiment, the base 502 may be at an angle to the chord length 210.

The end portion 602 of base 502 may be coupled to surface(s) X of blade 108 using adhesives and be formed from an elastic material which can conform to the thickness of the trailing edge 208. This may result in a reduction in air interference caused by installation of the flexible projection 302 onto the trailing edge 208.

Although FIGS. 6A-6B illustrate the flexible projection 302 being coupled to the blade 108 at an exterior surface, in some embodiments the flexible projection 302 may be integrally formed with the blade 108 at the trailing edge 208.

Figure 6D:
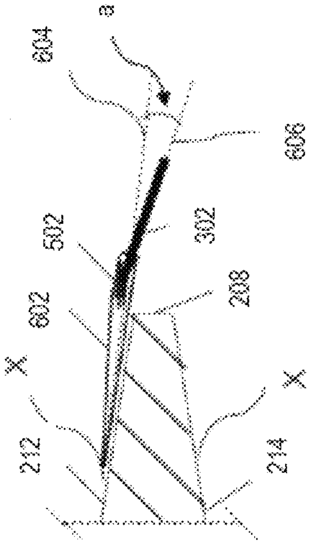
FIG. 6D is a side view of a flexible projection coupled to a trailing edge of a blade, according to some embodiments.

In some embodiments, as depicted in FIG. 6D, the flexible projection 302 may be at a relative angle "a" to the base section 502. The angle "a" is defined between the centerline 604 of the base 502 and the centerline 606 of the flexible projection 302. In a non-limiting example, the centerline 604 is parallel with the surface X of the pressure side 212 at the trailing edge 208. It would be understood that this configuration could be implemented identically on the suction side 212 of the trailing edge 208.

The angle "a" may be between (+/−) 0.5 degrees and (+/−) 10 degrees. In some embodiments, when the wind turbine 100 operates at wind speeds below the rated power, the angle of attach of the blade may be between −1 degrees and −3 degrees. Therefore, a desirable angle of attach would be −2 degrees in this example.

The angle "a" may be introduced in the design phase of the rotor blade to account for operational specifics of the turbine, and also to reduce the resultant load on the flexible projection 302 thereby reducing peeling and delamination.

The peeling force could result in the flexible projection 302 becoming detached when there is a significant pressure differential between the surfaces of the flexible projection 302 proximal to the suction and pressure sides 214, 212 of the blade 108. The flexibility of the flexible projection 302 may assist in reducing the peeling force due to the fact that the flexible projection 302 conforms to the local median air pressure vector such that the force vector of the airflow is significantly parallel to the curvature of the flexible projection 302.

Figure 7:
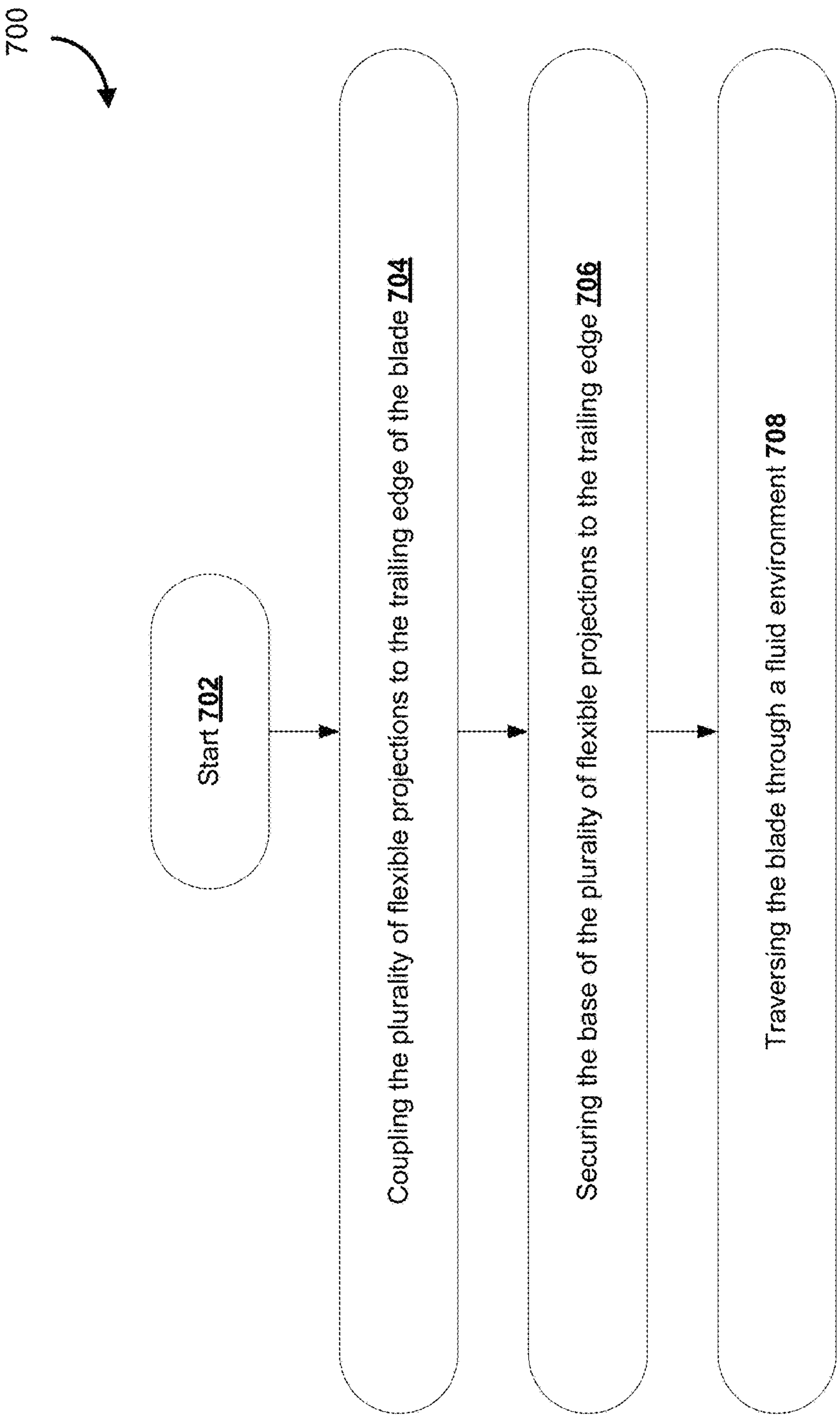
FIG. 7 is a method step diagram of coupling a flexible projection to a blade and traversing the blade through a fluid environment, according to some embodiments.

FIG. 7 shows a method step diagram of coupling a flexible projection 302 to a blade 108 and traversing the blade 108 through a fluid environment. The flexible projections 302 are coupled to the trailing edge of the blade 704 either prior to, or after, the blade 108 has been installed on a fluid power device such as a turbine. In some embodiments, the flexible projections 302 are coupled to the trailing edge 208 as a retro-fit after the blade 108 has been installed on the turbine 100. In some embodiments, the flexible projections 302 are coupled to the trailing edge 208 of the blade 108 before the blade 108 is installed onto the turbine 108. After the flexible projections 302 are coupled to the blade 108, the base of the flexible projection is secured to the trailing edge 706. In some embodiments, the base 502 is secured to the trailing edge 208 on either one or both of the pressure and suction side 212, 214. In a further embodiment, the base 502 is secured to the trailing edge 208 by one or more of a mechanical fastener, an adhesive, chemical bonding or a weld. In some embodiments, when the flexible projection 302 is coupled to the trailing edge 208 of the blade 108 before the blade 108 has been attached to a turbine 100, the base 502 may be integrated into a cavity formed along the trailing edge 208. Once the flexible projection is secured to the trailing edge 706, the blade is traversed through a fluid environment 708 to either extract power from, or output power to, the fluid environment.

In operation, the proposed flexible projection 302 may be implemented across various types of airfoils which traverse a fluid environment. The proposed flexible projection is also not limited to environments where the working fluid is air as the proposed flexible projection may be used for liquid working fluids such as water. As a list of non-limiting examples, the proposed flexible projection may be implemented within high altitude wind power devices, tidal turbines, kite wind turbines, energy kites, urban wind turbines, helicopters, airplane wings, seacraft wings, gliders and drones. Further, the proposed flexible projections may be implemented in both personal and commercial scale projects, such as commercial or civilian aircrafts, and small scale or industrial wind turbine units.

In a preferred embodiment, a plurality of alternating flexible projections 302 and troughs along its trailing edge 208 designed to traverse a fluid medium, the airfoil comprising an elongate body having a root end 202, a tip end 204, a pressure side 212, a suction side 214, a leading edge 206 and a trailing edge 208 separated by a chord length 210. The airfoil described uses the plurality of flexible projections 302 and troughs to negate noise (e.g., trailing edge noise), which is a function of wind speed and chord length.

The alternating flexible projections 302 and troughs, in operation, have specially adapted geometries that are adapted for noise modification (e.g., noise reduction). The geometries that can be established have axial spacing, distances between troughs, among others. The alternating flexible projections 302 and troughs can, in a preferred embodiment, be provided in the form of a flexible double-peaked serration, where a first peak and a second peak can have different heights. There can be a "primary" trough established between discrete serrations, and a "secondary trough" established between the first and the second peak (e.g., at the midpoint or any another point between the first and the second peak). Each of these peaks and their corresponding geometries can be adapted to provide an improved flexible serration that causes noise modification in respect of a target frequency or a target band of frequencies (which may also be impacted by the wind speed at a particular chordal section of a turbine). The flexible serrations operate by spreading out the mixing of the air over a larger area, and prevent the turbulent nature of the mixing to occur all at once in one location. This dissipates the energy differentials of the two flows over a greater timespan, thus reducing the threshold for turbulent sound formation.

The flexible double-peaked serration has a projection length which is defined by the length between the highest point of the peaks and the lowest point of the primary trough. This length defines the portion of the flexible projection 302 which will conform to the curvature of the natural flow vector at the trailing edge 208 of the turbine blade 108. As discussed above, in operation, the flexible projection 302 may reduce the noise generated at the trailing edge of the blade 108 by reducing the interference between the flow vector and the projection 302. However, in some embodiments, there may still be turbulence that is generated by the flexible projection due to mixing of the fluid flow at the trailing edge of the projection 302. For example, surface level imperfections and coupling mechanisms may still generate noise at the trailing edge 208 of the blade 108. The flexible double-peaked serration may further reduce the noise generated at the trailing edge 208 of the blade 108 through the use of a primary and secondary trough which increase the surface area for mixing of the fluid flow, and thereby reducing the generation of turbulent sound. By conforming to the fluid flow vector, the flexible projection 302 may increase the proportion of air flow along the trailing edge that is directed into the primary and secondary trough for mixing, thereby improving the attenuation of the turbulent sound formed at the trailing edge 208.

In this embodiment, some of the air will instead mix at the troughs of the flexible serrations. If these troughs are separated by a distance d' equal to half a sound wavelength, the noise at that wavelength will experience destructive interference, and noise at adjacent wavelengths will experience a progressive reduction equal in intensity following a parabolic relationship, and can thus have a technical effect of modifying (e.g., reducing) the overall sound generation.

In some embodiments, the noise at a particular wavelength, instead of being attenuated, is shifted to a different, either less harmful/undesirable frequency, or potentially shifted to a useful frequency (e.g., for animal deterrence). Reductions in w' or w" bounded by practical limitations in production and use can have beneficial technical effects in allowing for more destructive interference to occur, and in targeting more frequencies of interest. Alterations in d" can have impacts on reduced eddy flow by allowing air to mix at alternating axial positions. This can further reduce noise proliferation and impact tonal aspects of the noise that is emitted.

Allowing for air to mix at different axial positions behind a rotor blade 108 may be advantageous in that it reduces eddy formation which in turn may improve the wake behind the turbine by increasing mixing and reducing drag. The formation of eddies can have a negative effect on aerodynamics and the threshold for eddy formation is reduced by offsetting peaks at different axial positions. This is to say, that the energy required for eddy formation is less when the axial position is spaced out over a longer time space. This is a feature of Time Dependent Energy Transfer, a physics phenomenon first described by the present inventor.

d" is the difference in height between two peaks of the flexible serration. d" alterations lead to one peak being higher than the other, which creates different axial positions for air to mix. For example, d" can be measured as the height of the left peak subtracted by the height of the right peak, with positive values indicating that the left peak is higher, and negative values indicating that the right peak is higher. As noted, the different axial positions impact eddy flow as there are alternating axial positions for flow. These impact noise proliferation and impact tonal aspects of noise by shifting sound made from one frequency to another. In particular, it can be desirable to shift lower frequency noise to higher frequency noise as the noise travels less far from the turbine or it attenuates in atmosphere faster than low frequency noise (e.g., shorter wavelength). There are different versions of d" configurations contemplated.

The geometry of the alternating flexible projections and troughs may be configured such that two adjacent troughs are positioned relative to each other with different axial distances in the chord-wise direction, such that each may initiate a sound wave of a known frequency range that, when interacting with the proximate sound wave created by its neighboring trough, cancels itself out deconstructivity (e.g., with destructive interference).

Figure 8:
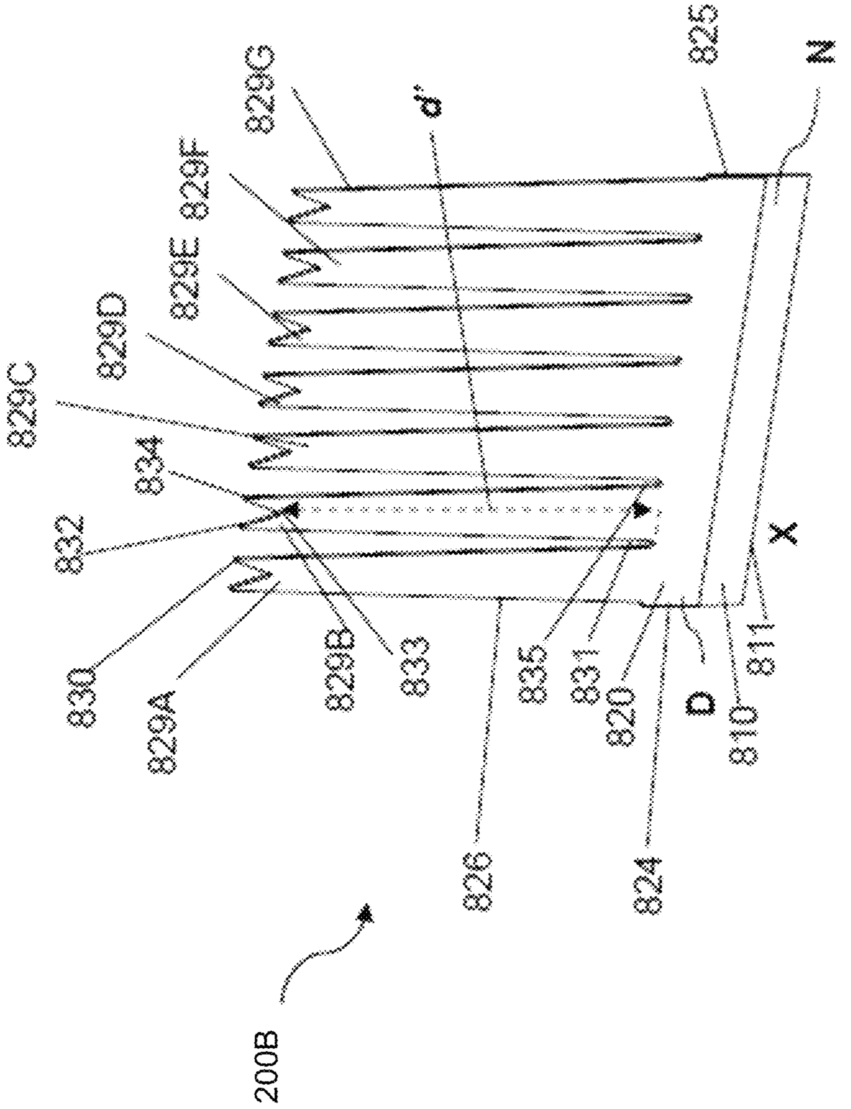
FIG. 8 is a side perspective view of a section of a flexible projection and trough, according to some embodiments.

FIG. 8 is a side perspective view of section 200B of structure 300, according to some embodiments. Section 200B may contain a base section 820 which is chamfered at an end portion 810 such that the edge 811 of the base section 820 meets flush with the surface X of the trailing edge 208 of the blade 108 (shown in greater detail in FIGS. 10A-10B). This arrangement may ensure that there is as little interference as possible with the natural flow of the air coming from the surface X over the base section 820. As illustrated, section 200B may have a near end N and a distal end D. Structure 200B may be retrofitted or integrated onto blade 108 such that distal end D is in closer proximity to tip 204 of blade 108 than near end N. Chamfering is an additional approach that can be utilized to further improve noise reduction performance. The chamfered design is another contemplated embodiment.

Through the provisioning of the flexible serrations, instead of all the air flowing under the airfoil and then mixing with all the air flowing over the airfoil at the same chordwise location, the flexible serrations spread out the mixing over a larger area, and prevent the turbulent nature of the mixing to occur all at once in one location. Some of the air will mix at the troughs. If these troughs are separated by a distance equal to half a sound wavelength, the noise at that wavelength will experience destructive interference, and be quieter.

As illustrated in FIG. 3, multiple sections 200A-200E of structure 300 can be aligned along the trailing edge of blade 108. Each section 200A-200E may be coupled to an adjacent section 200A-200E by coupling a side interface 825 located at distal end D of a given section 200A-200E with a side interface 824 located at a near end N of an adjacent section 200A-200E (not shown, see FIG. 8). In some embodiments, the side interface 825 (see FIG. 8) of a given section 200A-200E may be geometrically configured to mate or nest together with the side interface 824 of an adjacent section 200A-200E. In some embodiments, side interface 825 of a given section 200A-200E may have an equal but opposite geometry to side interface 824 of an adjacent section 200A-200E.

As depicted, section 200B of structure 300 contains a plurality of projections 829A-829E that extend parallel to chord length 210 when structure 300 is retrofitted onto blade 108. For simplicity purposes, the construction of projections 829A-829F will be explained in relation to projection 829B. However, it should be understood that each of the projections 829A-829F may be of a same construction. As depicted, projection 829B may have two or more peaks 832, 834. A primary trough 831 may be defined between projections 829A, 829B and a secondary trough 833 may be defined between the two or more peaks 832, 834. There is no specific number of troughs needed for the flexible serration to work. However, the width of the flexible serration scales with their length, which is proportional to the chord length 210. Generally, the shorter the chord length 210, the more troughs.

Without structure 300, air moving along the suction side 214 and air moving along the pressure side 212 could converge and mix abruptly at a chordwise location along the trailing edge 208 of blade 108, creating undesirable turbulence and noise. However, when structure 300 is retrofitted onto blade 108, structure 300 may cause at least some of the air moving along the suction side 214 and at least some of the air moving along the pressure side 212 to mix at the primary and secondary troughs 831, 833 of projection 829B. In other words, structure 300 causes some air from the suction side 214 and some air from the pressure side 212 to mix at primary and secondary troughs 831, 833 rather than at the trailing edge 208 of the blade 108. The mixing of the air can create noise.

As described above, the primary and secondary troughs 831, 833 define two regions where air moving along the suction side 214 and air moving along the pressure side 212 may mix. The air moving along the suction side 214 may have a different flow velocity than the air moving along the pressure side 212. When the airflows interact at primary or secondary troughs 831, 833, it may result in flow mixing and sound proliferation. In order to reduce an amount of sound generated by primary and second troughs 831, 833, structure 300 may be geometrically constrained to maintain a certain positioning of primary trough 831 relative to secondary trough 833. Specifically, a lowest point of primary trough 831 may be spaced apart from a lowest point of secondary trough 833 by a distance d' to reduce sound proliferation. The initiation point of these two flow interactions (i.e., at primary and secondary troughs 831, 833) is critical to the initiation of a sound wave and occurs at the minima of the troughs 831, 832. When a sound wave is formed at a primary trough 831, its relational dependency with another sound wave formed at secondary trough 833 at a specific spatially-determined distance d' is important in that the interaction between the two sound waves produces a reduced sound power level. To be precise by way of example, an energy maxima within a sound wave coming from primary trough 831 will interact with an energy minima coming from a secondary trough 833 to nullify the two sound waves.

In some embodiments, each of the projections 829A-829F in a given section 200B may have a height relative to the edge 811 of the base 810 that is the same as the height of other projections 829A-829F in the given section 200B. In other embodiments, one or more of the projections 829A-829F in a given section 200B may have a height relative to the edge 811 of the base 810 that is different than the height of the other projections 829A-829F in the given section 200B.

Figure 9:
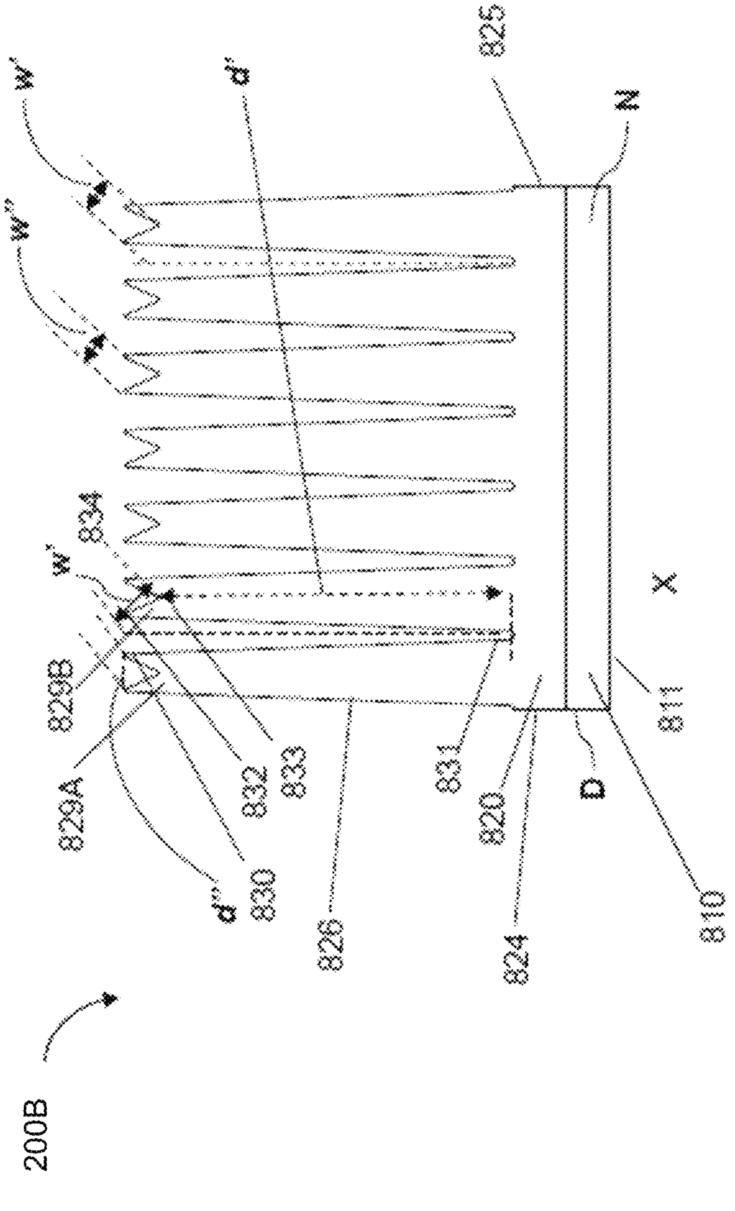
FIG. 9 is a front view of the section of the flexible structure shown in FIG. 8, according to some embodiments

FIG. 9 is a front perspective view of section 200B of structure 300, according to some embodiments. As depicted, the height of first peak 832 relative to the edge 811 of the base section 820 may be different than the height of second peak 834 in projection 829B. For a specific flexible serration, there can be a first peak 832, and a second peak 834, and these may have a smaller trough 833 between the two peaks as well as a larger trough 831 between individual flexible serrations.

Different lengths of flexible serrations may be possible. For example, it is believed that with "alternative" flexible serrations, longer lengths reduce noise at low angles of attack. The longer the flexible serration, the higher the cost and chance of damage. In a specific embodiment, 832 and 834 have different lengths. As example, 832 has a length of 30 cm while 834 has a length of 31 cm. This changes the local position of eddy formation and helps to reduce its impact to the wind farm.

Further, the second peak 830 of projection 829A may have a height relative to the edge 811 of the base section 820 that is different than the height of the first peak 832 of the projection 829B relative to the edge 811. As depicted, the second peak 830 of the flexible projection 829A may be shorter than the first peak 832 of the flexible projection 829B by a distance d''. As illustrated, the lowest point of primary trough 831 and the lowest point of a secondary trough 833 are separated by a distance d'. Since distance d' is determined based on the lowest point of primary trough 831 and the lowest point of a secondary trough 833, distance d' may be determined without consideration of a highest point of the two or more adjacent peaks 832, 834. As mentioned previously, maintaining a distance d' between the lowest point of primary trough 831 and the lowest point of a secondary trough 833 is critical for reducing the amount of sound generated by primary and second troughs 831, 833.

Distance d' may be determined as a relation between at least a speed of sound, a boundary layer displacement thickness, and a total local wind speed. d' can be an approximate number and noise cancellation at the most dominant frequency is conducted. While there may be some non-idealities, there can be some inaccuracy in the value of d', however, there may be some reduction in noise-modification benefits at the target frequency. Given the non-idealities, while the relation can be utilized for establishing the geometric configuration, there is some tolerance for deviation. For example, although neighboring frequency values may be affected, there is still a limited benefit, even if manufacturing tolerances have led to a significant deviation. As an example, values such as d' may vary from +/−1%, 2%, 3%, 4%, 5%, 6%, 7%, 8%, 9%, 10%, 11%, 12%, 13%, 14%, 15%, and any range continuously in between, etc. In some embodiments, distance d' between a primary and secondary trough may be determined based on the following formula:

$$d' = \frac{U_s \partial_{BL}}{0.14\ U_L} \qquad (1)$$

An example calculation is given below:

$$d' = [(343\ \text{m/s})(0.015\ \text{m})/(0.14)(57\ \text{m/s})]$$

$$d' = 0.645\ \text{m}$$

Equation 1 may provide the distance d' between a given primary and an adjacent secondary trough, such as primary and secondary troughs 831, 833, at a specific radial position relative to axis R (i.e., specific position along the length L of blade 108). In equation 1, $U_s$ represents the speed of sound that is determined based on an operating temperature; $\partial_{BL}$ represents the boundary layer displacement thickness of blade 108; and $U_L$ represents the total wind speed. The speed of sound $U_s$ may be determined based on an average operating temperature in the particular region where wind turbine 100 is located, as designated below in Table 2.

TABLE 2

| Temperature (° C.) | Speed of Sound $U_s$ (m/s) | Wavelength (cm) @ 1 Khz | Change in (w) between it and the following (w) |
|---|---|---|---|
| 20° C. | 343.216 m/s | 34.322 cm | 0.059 cm |
| 19° C. | 342.63 m/s | 34.263 cm | 0.059 cm |
| 18° C. | 342.043 m/s | 34.204 cm | 0.058 cm |
| 17° C. | 341.455 m/s | 34.146 cm | 0.059 cm |
| 16° C. | 340.866 m/s | 34.087 cm | 0.059 cm |
| 15° C. | 340.276 m/s | 34.028 cm | 0.061 cm |
| 14° C. | 339.685 m/s | 33.967 cm | 0.058 cm |
| 13° C. | 339.093 m/s | 33.909 cm | 0.059 cm |

The boundary layer displacement thickness $\delta_{BL}$ may be determined based on the radial position of the primary and secondary trough (i.e., specific position along the length L). In some embodiments, the boundary layer displacement thickness $\partial_{BL}$ may be determined based on the shape of blade 108, chord length 210 which is related to the radial position of the primary and secondary trough, average local flow velocity, which is based on radial position on the blade, control settings and atmospheric incoming wind, and the angle of attack. The relationship is a complex relationship that includes a number of complex differential equations.

Adding the curvature of the airfoil requires the more complex approach for analyzing the boundary layer. The boundary layer $\delta_{BL}$ height is estimated at the point local air velocity equals 99% of upstream air velocity $U_\infty$.

The pressure gradient along the airfoil is given by $$\frac{\partial P}{\partial x},$$

where P is pressure and x is the chordwise length.

For incompressible flows the pressure gradient is:

$$\frac{\partial P}{\partial x} = -\rho U \frac{\partial U_\infty}{\partial x}$$

The flow is one dimensional and can be governed by conservation of mass and conservation of momentum. Shear stress on the surface is given by τ. When integrating over a control volume, the equation becomes:

$$-U_\infty \int_0^{\delta_{BL}} \frac{\partial Pu}{\partial x} dy + \int_0^{\delta_{BL}} \frac{\partial Pu^2}{\partial x} dy = \rho U_\infty \frac{\partial U_\infty}{\partial x} \delta_{BL} - \tau$$

Using Blassius' approach, it is possible to predict an exact solution while the flow is laminar and the pressure gradient is zero. At the stagnation point:

$$\delta_{BL}^2 \frac{\rho \partial U_\infty}{\mu \partial x} = 7.052$$

The shape of the airfoil is approximated with a polynomial of best fit. The equation can have the following form:

$$\frac{\delta_{BL}}{\theta} = A\left(\frac{\rho}{\mu}\theta^2\frac{\partial U_\infty}{\partial x}\right)^2 + B\left(\frac{\rho}{\mu}\theta^2\frac{\partial U_\infty}{\partial x}\right) + C$$

With A, B, C as constants and θ being the momentum thickness.

In the turbulent region, the complex shape is approximated with:

$$\frac{u}{U_\infty} = \frac{y}{\delta}^{\left(\frac{\frac{\delta_{BL}}{\theta}-1}{2}\right)}$$

Certain values should be pre-set depending on relevant experimental data available.

As solving these formulas by hand is labor intensive, numerical method-based software is used. Accordingly, the boundary layer displacement thickness $\delta_{BL}$ may be determined by inputting these parameters into an airfoil analysis software such as XFOIL™ which runs a simulation based on these parameters and outputs the boundary layer displacement thickness $\delta_{BL}$. Total wind speed $U_L$ may be determined using the upstream wind velocity and the velocity of the rotating blade 108. The velocity of the rotating blade 108 may be calculated at a specific radial position where the given primary and secondary troughs 831, 833 are located (i.e., specific position along the length L). In some embodiments, the total wind speed $U_L$ may be determined using the following equation:

$$U_L = \sqrt{U_\infty^2 + \left(\frac{\pi r \omega}{30}\right)^2} \quad (2)$$

In Equation 2, $U_\infty$ refers to the upstream wind velocity, r refers to the radial position relative to the root, and ω refers to the revolutions per minute of the blade 108. The upstream wind velocity may be determined by the use of an anemometer in association with the turbine.

In some embodiments, distance d' between a given primary trough and an adjacent secondary trough may vary at different regions of the airfoil.

Specifically, distance d' between a given primary trough and an adjacent secondary trough may vary depending on the radial position of the primary and secondary trough relative to a root 202 (i.e., along a length L of blade 108).

As previously described, distance d' may be based on the speed of sound $U_s$ given the operating temperature, the boundary displacement thickness $\delta_{BL}$ and the total local wind speed $U_L$ (see Equations 1 and 2).

These parameters may vary depending on the radial position of the primary and secondary troughs relative to axis R (shown in FIG. 1). The total local wind speed $U_L$ may increase in a radial direction relative to axis R (as set forth in Equation 2). In other words, the closer the primary and secondary troughs are to a tip 204 of the blade 108, the greater the total local wind speed $U_L$ will be at that point. The chordal length 210 will also decrease in a radial direction relative to axis R.

In other words, the closer the primary and secondary troughs are to a tip 204 of the blade 108, the smaller the chordal length 210 will be at that point. Based on Equations 1 and 2 and the relationships explained above, it can be drawn that distance d' may decrease towards a tip 204 of the blade 108 and may increase towards a root 202 of the blade.

In an optimal setup, the chordal relationship d' between a primary and secondary trough may be half the wavelength of the dominant local frequency.

This setup provides the optimal condition for destructive interference of the first and second sound wave. The dominant local frequency at primary and secondary troughs may be specific to the radial position of the primary and secondary troughs.

The dominant local frequency may be dependent on the boundary displacement thickness $\delta_{BL}$ which may be different depending on the radial position of the primary and secondary troughs. As the radial position changes, the chord length 210 also changes, and consequently the boundary layer displacement thickness $\delta_{BL}$ will change. The larger the boundary displacement thickness $\delta_{BL}$, the lower the dominant frequency. The reverse is also true.

With reference to FIG. 3, distance d' between the primary and secondary troughs contained in a given section 200A-200F may be identical. In some embodiments, distance d' between the primary and secondary troughs contained in a given section 200A-200F may be different than distance d' between the primary and secondary troughs contained in each of the other sections 200A-200F. Distance d' between the primary and secondary troughs contained in a given section 200A-200F may depend on the section's radial position relative to axis R. The radial position of a given section 200A-200F may be based on the average local flow velocity seen for any given section 200A-200F, with the length of the section being a governing factor. As example, to simplify the equation, one might derive an averaged radial position that represents the midpoint of values seen in a given section.

In some embodiments, each section 200A-200F may have one value for the boundary displacement layer thickness $\delta_{BL}$, representing an averaged boundary displacement layer thickness $\delta_{BL}$ determined using the median value for radial position of the given section 200A-200F. A non-limiting example is shown at TABLE 3.

TABLE 3

| | Portion Number | Distance from Tip (m) | Boundary Layer Displacement Thickness (mm) |
|---|---|---|---|
| 200A | 1 | 0.5 | 3.8 |
| 200B | 2 | 3.5 | 5.0 |
| 200C | 3 | 6.5 | 5.8 |
| 200D | 4 | 9.5 | 6.6 |
| 200E | 5 | 12.5 | 7.4 |
| 200F | 6 | 15.1 | 8.2 |

Similarly, each section 200A-200F may have an approximated total wind speed $U_L$ determined using the radial position at an averaged midpoint of the given section 200A-200F. Distance d' between the primary troughs and secondary troughs in a given section 200A-200F may be determined based on the approximated boundary displacement layer thickness $\delta_{BL}$ and approximated total wind speed $U_L$ for the given section.

The number of sections can change, for example, a continuous set of sections, or a discrete number of sections (e.g., 2, 3, 4, 5, 6, 7, 8, 9, 10). A trade-off between complexity, effectiveness, and cost is considered when determining the number of sections. For example, on a 2 MW turbine, with a 45 m blade, there could be a total of 15 meters of serrations. That 15 meters can be broken into 6 discrete sections, each with a length that is approximated to the median of that grouping. Each section faces different wind speeds (e.g., due to radial positioning distally or proximally from the root), and accordingly, each section can use a different flexible serration configuration, because different wind speeds equate to different frequencies to attenuate. The wind speeds can change as a function of radial distance from the root, and this relationship can be linear. Between each flexible section, different values can be used for d'. In an additional embodiment, d" may also change per section.

As shown in FIG. 3, distance d' between primary and secondary troughs may be greatest in section 200F (furthest from tip) and lowest in section 200A (closest to tip). Distance d' may progressively decrease in size from section 200F to section 200A along sections 200B-200D. As noted, d' can be established on a sectional basis, or on a continuous or per serration basis depending on the practical installation and operational constraints. The value of d' can thus shift as a function of a distance from a tip, or as a distance from a root (e.g., how distal or proximal the flexible serration is). The d' for a particular flexible serration can be based on the wind speed encountered at the midpoint of the flexible serration for example. Other points can be selected (e.g., the near or the far edge of the flexible serration instead).

In another embodiment, distance d' between a given primary trough and adjacent secondary trough may be based on the specific radial position of a given primary trough and an adjacent secondary trough relative to axis R. This function can be a linear function. In this embodiment, structure 300 may not be segregated into sections 200A-200F and distance d' between a given primary trough and adjacent secondary trough may be based on the specific boundary displacement layer thickness $\delta_{BL}$ and specific total wind speed $U_L$ corresponding to the radial position of the primary trough and adjacent secondary trough. Distance d' may be calculated using equation (1). This in turn would result in a structure 300 that has a distance d' that progressively decreases in value towards the tip 204. In all cases, the value d' should be between 5% and 45% of the local chord length 210 using equation (1) or using the median value for radial position of the given section 200A-200F and taking that chord length 210, as example. More specifically, d' should aim to fall between 10% and 25%, and more preferably 18%-20%. This ensures that no undue aerodynamic loads are placed on the airfoil and the loads on the structure itself are manageable throughout the relevant operating conditions. This range hits the best performance of noise reduction as the local frequencies of interest tend to be created with a wavelength corresponding to these values of d'. Further, given the constraints of increased loads at increased percentages of chord length 210 and reduced performance of smaller percentages of chord length 210, this range has been found to be optimal for a majority of circumstances. Peeling forces must be taken into account, especially if the structure exceeds 25%, adhesive solutions and material choices become limited and expensive. In specific cases when wind turbine blades are longer than 75 meters, the flow velocity at the tip will likely result in loads, such that a desirable value of d' should be 10%, 11%, 12%, 13%, 14% or 15%.

As shown in FIG. 9, d" is the difference in height between two peaks, 832 and 834 in this example. d" alterations lead to one peak being higher than the other, which creates different axial positions for air to mix. For example, d" can be measured as the height of the left peak 832 subtracted by the height of the right peak 834, with positive values indicating that the left peak 832 is higher, and negative values indicating that the right peak 834 is higher.

The selection of which peak is higher can be determined, for example, based on the fluid direction. For example, if the right side is the part of the blade furthest from the hub, in some embodiments, the right peak is higher, and in some embodiments, the left peak is higher.

As noted, the different axial positions impact eddy flow as there are alternating axial positions for flow. A layman's description of alternating axial positions for flow includes a first peak extending a few millimeters further than a second peak, to give d".

These impact noise proliferation and impact tonal aspects of noise by shifting sound made from one frequency to another. In particular, it can be desirable to shift lower frequency noise to higher frequency noise as the noise travels less far from the turbine or it attenuates in atmosphere faster than low frequency noise (e.g., shorter wavelength). There are different versions of d" configurations contemplated.

In first embodiment, each d" has the same orientation, meaning that the left peak or the right peak is consistently higher than the other. As noted above, this can be directional based on which side is closer to the hub and which is distal from the hub.

In a second embodiment, each d" may have an opposite orientation, meaning that the serrations alternate between the left and the right peak being higher. For example, in the first embodiment, d" is always a positive or a negative value. In the second embodiment, d" alternates between positive and negative values (e.g., left is higher then right is higher, and so on).

d" values or configurations can be constant across the flexible serrations, or in some embodiments, may be continuously shifting depending on the identified outcome at a particular point along the blade based on the distance from the hub, for example. In another variation, there are separate sections each having a different d" value or configuration. This variation is easier for manufacture but is less targeted than a continuously varying version for each flexible serration, but both can be useful in improving the noise properties of the turbine blade.

Finally, each section can also have different configurations, and this may be dependent on the type of fluid flow experienced at each section. The value/configuration for d" can be determined based on a combination of contributing factors from d', w', and w" as each of these may contribute to the overall noise adjusting properties of the flexible serrations. For example, d', d", w', and w" can be all selected together such that the overall noise modification for the turbine or a turbine farm as a whole matches a desired outcome, recognizing that the selection of d', d", w' and w" can also have other impacts on lift, drag, weight, or other aerodynamic factors relevant to operation. For example, d" can be selected or configured in an attempt to shift undesirable sound into frequencies that potentially deter animals.

Referring to FIG. 9, in some embodiments, the radial distance w' between a primary trough and adjacent secondary trough may be selected and determined based on the distance d' between the primary trough and the secondary trough.

The radial distance w' between a primary trough and an adjacent secondary trough may be determined based on the distance d' and a dominant frequency to be reduced. Varying w' and w" (where w" is a radial distance between a first peak 832 and a second adjacent peak 834) in addition to d' may have an additional benefit in allowing for more or less flexible projections and troughs per length of blade, allowing for additional noise reduction in a given section of blade that is known for producing more noise (in the case with reduced w' and w"). As example, if higher frequency bands are desirable to be reduced, additional flexible projections per radial length may be necessary as the wavelengths are of decreased length, and thus an increased w' and w" may lead to a beneficial effect.

In some embodiments, the radial distance w' may be determined using the following equation:

$$w' = \frac{d' \times K}{\frac{f}{3}} \times 1000 \quad (3)$$

$$f = \frac{0.07\ U_L}{\delta_{BL}} \quad (4)$$

An example equation is given below:

$$w' = [((0.645\ \text{m})(0.07)/(580\ \text{Hz}/3)) \times 1000]$$

$$w' = 0.233\ \text{m}$$

In Equation 3, the distance d' is multiplied by a constant K. In some embodiments, the optimal value of constant K is 7% or 0.07. However, it should be understood that the value of constant K may be any value between 1%-99% or 0.01 to 0.99. The product is then divided by one third of the dominant frequency in the band, according to harmonic theory. F may represent the dominant frequency at the specific radial position where the primary trough and the adjacent secondary trough are located. The dominant frequency may be determined using Equation 4.

In Equation 4, the factor 0.07 is proposed, but other values may be possible.

The values of total wind velocity $U_L$ and boundary layer displacement thickness &BL in Equation 3 may be the same as the total wind velocity $U_L$ and boundary layer displacement thickness $\delta_{BL}$ previously determined.

Example values of w' and w" are shown for portions as shown in FIG. 3. The values for w', for example, can depend similarly from a portion to portion basis in a discrete stepwise manner, or in another embodiment, can be evaluated for every flexible serration such that every flexible serration is configured on an individual basis.

| | w' (mm) | w" (mm) |
|---|---|---|
| 200A | 12.0 | 12.0 |
| 200B | 20.7 | 20.7 |
| 200C | 27.0 | 27.0 |
| 200D | 33.7 | 33.7 |
| 200E | 42.6 | 42.6 |
| 200F | 51.1 | 51.1 |

In some embodiments, F may represent the dominant frequency at the specific radial position of a section 200A-200F where the primary trough and the adjacent secondary trough are contained within (i.e., along a length L of blade 108).

The chamfering of end portion 810 may also change along the length L of the blade 108. The chamfering of end portion 810 may change such that the flow may move from a surface X of a trailing edge to a base 820 of the structure 300, over more surface area at a smaller radial position. The chamfer in this case, could be more severe, given the reduction in flow velocity. The flow in this case has a lower velocity and thus may be acted upon to change its vector without transitioning to turbulent flow. By contrast, the chamfer in the case of a further radial section could be less severe, to allow for a reduction in flow vector change, given increased local flow velocity. In addition, the introduction of sinusoidal geometry onto the chamfer may be included to induce local flow acceleration and the prevention of turbulence and noise at the trailing edge.

In some embodiments, the radial distance w" between the two peaks of a given projection may be 1/10th of the length of d'.

In addition, determining the values of d', d", w' and w" in practical applications have aerodynamic considerations. The aerodynamic lift over drag performance of an airfoil may be improved through modification of the aforementioned values. Further, in the case of airfoils that are designed to work in a system together, they may be tailored to improve the wake recovery. This is the case for wind turbines, as example, where the current wake propagation is strongly driven by the aerodynamics of the outer portion of the turbine blade, which is the application region for sections 200A-200F, as described previously. For d' and d", the effective chord 210 of the blade 108 is altered, which necessarily alters the aerodynamics. Considerations to the degree to which this is changed at specific radial sections along the blade 108 must be made in concert with information on the operational parameters and climactic regime of the turbine, including the desired noise reduction. Changes in w' and w" alter the number of aerodynamic elements interacting with the flow and thus, changing the flow pattern. As example, in highly turbulent wind regimes, an increased value of d' and d" and a decreased value of w' and w" will result in more fluid contact with the structure 300 and cause the flow to become ordered, reducing noise caused by TE-TBL noise. To affect the flow pattern in desirable ways, alterations to the specific geometry of one or more of the peaks 832, 834 may be made. This may include deflecting or rotating one or more of the peaks 832, 834 away from the centerline 862 of the base section 820 or, if the flexible projection 829G is at some angle 'a' to this base section 820 as in FIG. 6D, the centerline 861 of the flexible projection 829G. This deflection or rotation induces momentum transfer within the fluid in downstream locations and enables the flow to be re-energized in a quicker manner by the induction of the freestream flow velocity. In cases of increased values of d' and d" and decreased values of w' and w" the deflection or rotation will be less than in cases where the values of d' and d" are decreased and the values of w' and w" are increased, relatively. The reason is that, with increased flexible projections 829G, the degree of deflection or rotation is not required as much to achieve the desired effect. Care must be taken such that this is conducted in regions where noise is not a concern, such as in offshore locations, or, if noise is a concern, that the geometry change allows for the operation within permissible noise limitations. In all cases, the main goal is to produce as much aerodynamic uplift as possible within loading limitations, with increased wake recovery, and as little noise emissions or wildlife impact as possible. As such, one may tailor the effects of this invention to the specific attributes they would like, whether that be maximal noise reduction or power performance, given the physical limitations of the turbine structure (FIG.

1). The best configuration for noise reduction will occur when the values of d' and d" correspond to the dominant frequency being generated by the airfoil or control surface. The best configuration for power performance will occur when the values of w' and w" correspond to mean flow velocity, where the value of w' and w" taken together in millimeters is equal to or less than the flow velocity in meters per second. With this in mind, a blade designer may take these considerations to heart when designing an airfoil for a specific business jurisdiction, or wind regime. In a recent field campaign, an example section 200E contained d' at 300 mm, d" at 10.2 mm, w' at 31 mm and w" at 30 mm as part of a series of serration sections 300, providing tangible acoustic benefits of 3 dB reduction over an alternative serration.

A reduction in wake is beneficial for installation in a retrofit situation, in that the downstream turbines will benefit from increased wake mixing and increased flow velocities. This is turn improves the revenue generated from a wind farm, as the overall wind speeds impinging on the rotor will be increased. Losses within commercial wind farms from wake effects have been determined to be as high as 20%. In addition, far-field wake effects are now being recorded on wind operators balance sheets, as one offshore wind farm blocks another offshore wind farm. This can happen as far as 100 km away.

Flow patterns can become entrained within the wake and maintain the wake for extended distances. These large-scale blockage effects can impact siting and increase costs for developers. This is a relatively new field within the wind industry, and as such, technologies that can reduce the wake impact in a retrofittable manner are highly desirable.

Reductions in flow speed fluctuation can also have beneficial impacts on turbine fatigue and structural loads, meaning less maintenance is required to operate the assets. Improving the flow velocity so that it is closer to the freestream velocity achieves this and is a desirable outcome.

A reduction in wake is also beneficial for turbine designers and wind farm developers who wish to include as many turbines as possible on a given area of land or sea. Further, aerodynamic and acoustic benefits can be modelled using high, medium and low fidelity computational models to simulate impacts on levelized cost of energy. High fidelity models can be Large Eddy Simulations (LES), as example, where a low fidelity models can be wind resource assessment, siting and energy yield calculations using WaSP. Developers using tools like WaSP can simulate the effect of wake changes in a wind farm and model how technologies can assist in this outcome. This in turn can steer a wind power project from being un-bankable to being bankable and financed.

The technologies discussed herein may also be coupled with other technologies to beneficially improve the performance of a wind turbine and wind farm and improve the downwind rotor wash. These may include, but are not limited to, vortex generators, winglets, leading edge erosion prevention technologies, or devices that improve the lift of the main rotor blades. Wake reduction is achieved through the mechanism of momentum transfer between the freestream flow velocity, which is moving faster and the wake, which is travelling slower. When these two flows interact and mix, momentum transfer occurs, and the net flow velocity is increased, as the wake takes momentum from the freestream flow.

Figure 10A:
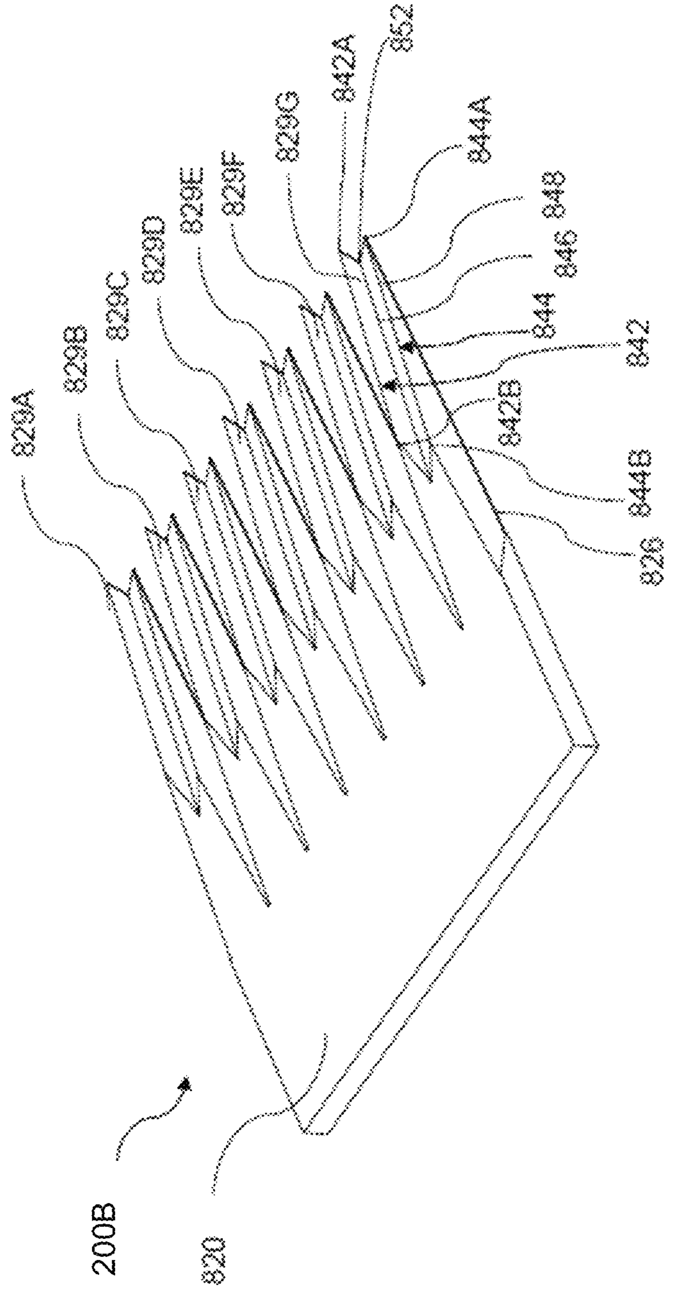
FIG. 10A is a side perspective view of the section of the flexible structure shown in FIG. 9, according to some embodiments.

FIG. 10A is a side perspective view of section 200B according to an embodiment of the invention. Section 200B may contain a base section 820 and a plurality of flexible projections 829A-829G.

For simplicity purposes, the construction of flexible projections 829A-829G will be explained in relation to flexible projection 829G. However, it should be understood that each of the flexible projections 829A-829F may be of a similar construction. As depicted, secondary trough 852 may be defined between the first peak 842 and the second peak 844.

As depicted, a tip of the first peak 842 may be chamfered progressively from a first height 842A to a second height 842B along a midline 846. First height 842A may be less than second height 842B. Similarly, a tip of the second peak 844 may be chamfered progressively from a first height 844A to a second height 844B along a midline 848. First height 844A may be less than second height 844B. As illustrated, second peak 844 may define part of edge interface 826 of section 200B. The chamfered profile of flexible projection 829G may allow for a progressive reduction in space over time for the two different flow velocities to interact and come together in a more gradual way to prevent any interaction which would produce increased turbulence and noise. In this way, the chamfered profile of flexible projection 829G may be useful in reducing the onset of noise as compared to a blunt structure that contains 90-degree angles. Accordingly, the chamfered variation provides a practical benefit and the type of chamfering (e.g., the angles and shape profile) may impact the level of improvement.

Figure 10B:
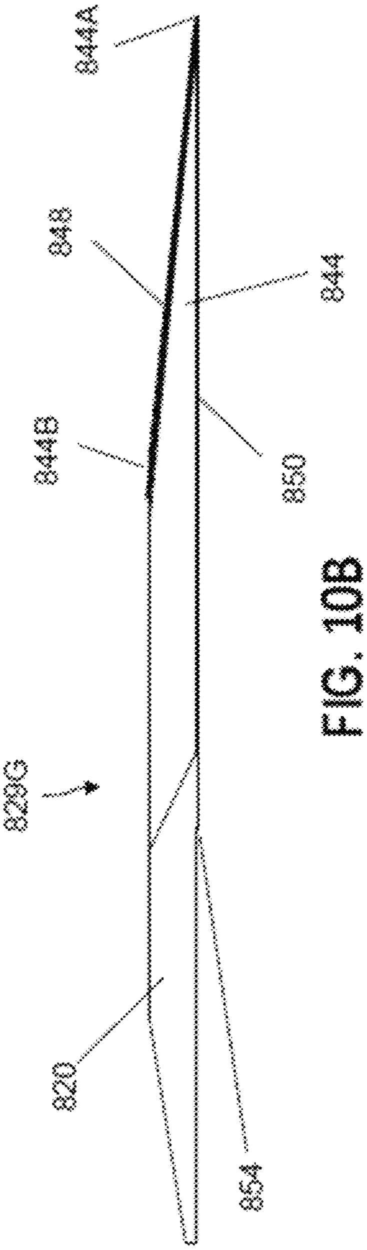
FIG. 10B is a side view of one of the flexible projections contained in the section of the structure shown in FIG. 10A, according to some embodiments.

FIG. 10B illustrates a side view of a flexible projection 829G. As illustrated, second peak 844 may be chamfered along midline 848 between a first height 844A and a second height 844B. In some embodiments, the tip of the projection 829G may be rounded (shown at first height 844A). In some embodiments, the base section 820 may contain a recess 854 to align section 200B with the trailing edge 208 of the blade 108. For installation, the recess 854 may be used to mate the base section 820 with the blunt trailing edge 208 of the blade 108.

Figure 10C:
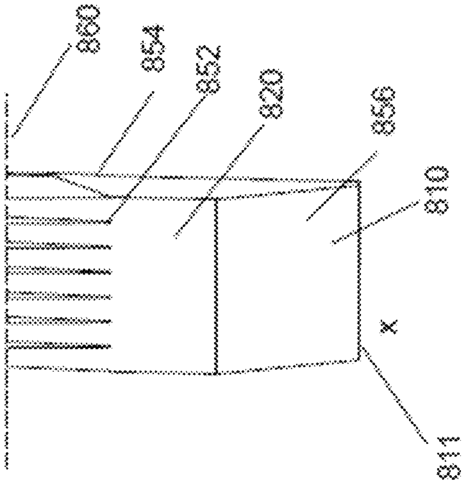
FIG. 10C is a top-down perspective view of a portion of the section of the flexible structure shown in FIG. 9, according to some embodiments.

FIG. 10C illustrates a top-down perspective view of a portion of section 200B, according to some embodiments. As illustrated, the base section 820 may be chamfered at an end portion 810 such that the edge 811 of the base section 820 meets flush with the surface X of the trailing edge 208 of the blade 108. The degree of chamfering, which determines where a maximal thickness distances 856 starts, is related to a distance from a trough 852 and local input parameters. As described above, it is the local flow velocity which determines the chamfering geometry. When the base section 820 is applied at a further radial position, the chamfer angle would ideally be smaller, to allow for a reduction in flow vector change, coming from the trailing edge 208 given the increased local flow velocity. The acute chamfer angle can range from 1 degree to 10 degrees. Less severe means that the length from an edge 811 to a maximal thickness distances 856 may be increased, meaning that the thickness is built up more gradually. The edge 811 may be exhibited through the use of a sinusoidal, curved or undulating flow surface, such that the flow may be guided to move to specific useful locations over the base section 820 that align with one or more troughs 852. This flow may adhere to the surface of the base section 820, and thus not create turbulence and unwanted noise.

As the local flow velocity is increased, the degree of chamfering should be less in these flexible projections which are at a further radial position. Firstly, the thickness of said flexible projections is less, so there is a reduced thickness to mate up with the trailing edge of the blade, and secondly, the flow vector should not be altered that much as any large change risks tripping the flow to turbulent flow. This arrangement ensures that there is as little interference as possible with the natural flow of air moving over the suction side 214 and pressure side 212 of the elongate body of the blade 108 at the point of the trailing edge 208.

Figure 11:
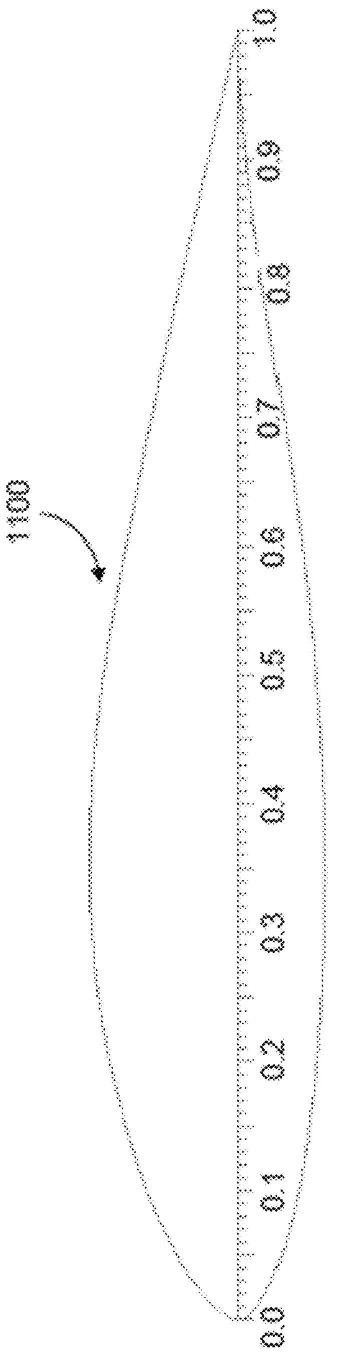
FIG. 11 is an example airfoil/airfoil shape, for reference.

FIG. 11 is an example airfoil/flow control shape, for reference. As shown in diagram 1100, the shape of the airfoil leads to technical challenges in assessing the boundary layer, which in some embodiments, numerical methods are utilized to approximate or estimate various characteristics of the boundary layer.

Such improvements described in various embodiments above may apply equally well to various other types of airfoil, not depending on the aerodynamic design thereof, mutatis mutandis, with such mutations as being relevant, including but not limited to, high altitude wind power (HAWP) devices, tidal turbines, kite wind turbines, energy kites, urban wind turbines, airplane wings, seacraft wings, gliders, drones, and other things. The approaches described herein may be applied to wind turbines having fewer or more blades than described by way of example in order to increase the operational efficiency and noise reduction capabilities of a wind turbine, to decrease vibration, loads, maintenance costs and mechanical wear, and to increase the scalability and marketability of such wind turbines.

The above-described airfoil configurations may be employed in aircraft such as commercial airliners, military jet aircraft, helicopter blades, helicopter wings, civilian airplanes, drones, and other similar aircraft.

It is observed that commercial airliners, civilian airplanes, drones, helicopter blades and the like, would have a plurality of flexible projections and troughs of a similar size-to-chord ratio to those of modern wind turbines, taking into consideration local flow velocity and the desired frequency range to be impeded.

The above-described configurations of structures for traversing a fluid environment may be applicable in combination with one or more of the configurations disclosed in co-pending PCT Patent Application No. PCT/CA2015//050740 to Ryan Church, filed on Aug. 5, 2015, entitled "STRUCTURE WITH RIGID WINGLET ADAPTED TO TRAVERSE A FLUID ENVIRONMENT," the contents of which are incorporated herein by reference, or in co-pending PCT Patent Application No. PCT/CA2015/050739 to Ryan Church, filed on Aug. 5, 2015, entitled "FLUID-REDIRECTING STRUCTURE," the contents of which are incorporated herein by reference.

Testing Results

Wind tunnel specifics: Recently, a blade profile with a chord of 914 mm was tested in an aero-acoustic wind tunnel at three wind speeds: 30 m/s, 50 m/s and 70 m/s. The profile was tested with and without a turbulator strip intended to simulate real-world turbulent wind conditions.

An example of structure 300 with a d' of 191 mm, d" of 7.5 mm, w' of 41 mm and w" of 41 mm was applied to the trailing edge of the profile and tested at various angles of attack between +/−15 degrees. The results from testing indicated that the average sound power level reduction was on the order of 8 dB (A).

Following this, field trials took place that placed structure 300 with variations of d', d", w' and w" for sections 200A, 200B, 200C, 200D, 200E, 200F to the trailing edge of a wind turbine blade. The results of noise testing show the industrial applicability and demonstrated utility in the approaches proposed herein, as significant reductions in noise were seen.

The technical benefits of structure 300 were achieved in field trials across a variety of parameter selections for d', d", w' and w". By way of a non-limiting example, one such field trial involved a 3MW-class turbine, which when operating with structure 300 at the trailing edge 208, has a peak or target frequency of 250 Hz. Depending on the size of the turbine blades used by the 3MW-class turbine, the average local flow velocity $U_L$ experienced by the turbine may be between the range of 78 m/s to 51 m/s (i.e., the average local air velocity $U_L$ for the smallest turbine blade variant of structure 300 may be 78 m/s, and the average local air velocity $U_L$ of the largest turbine blade variant of structure 300 may be 51 m/s). While the average local air velocities $U_L$ may be between 78 m/s to 51 m/s, the most extreme sustained local air velocity $U_L$ during operation of the 3MW-class turbine may be as high as 105 m/s for the smallest turbine blade variant of structure 300, and may be as low as 20 m/s for the largest turbine blade variant of structure 300.

Table 4 shows some of the field trial results for the reduction in sound power (dB) achieved across a range of frequencies (Hz) when structure 300 was fitted to a turbine blade. The positive numbers in the right column of Table 4 indicate a decrease in sound power achieved by the installation of structure 300 over the baseline tested without structure 300 installed.

TABLE 4

| Frequency (Hz) | Delta in Sound Power After Structure 300 Installed (dB) |
|---|---|
| 20 | 2.1 |
| 25 | 3.9 |
| 31.5 | 4.4 |
| 40 | 3.2 |
| 50 | 4.2 |
| 63 | 2.9 |
| 80 | 3.4 |
| 100 | 3.6 |
| 125 | 4.3 |
| 160 | 4.9 |
| 200 | 5.7 |
| 250 | 7.9 |
| 315 | 7.5 |
| 400 | 6.9 |
| 500 | 6.9 |
| 630 | 7.6 |
| 800 | 5.4 |
| 1000 | 3.7 |
| 1250 | 2.6 |
| 1600 | 0.4 |
| 2000 | −0.5 |
| 2500 | −0.6 |
| 3150 | −1.1 |
| 4000 | −1.7 |
| 5000 | −2.2 |
| 6300 | −3.3 |
| 8000 | −4.5 |
| 10000 | −5.9 |

The data in Table 4 shows that the best results for sound power reduction occurred in the frequency ranges of 200-800 Hz, with a peak sound power reduction achieved at 250 Hz.

In operation, the smallest variant of structure 300 which may be implemented on a 3MW-class turbine may have a distance d' of 0.13 m, which is the vertical distance between the lowest point of primary trough 831 and the lowest point of secondary trough 833. Further, the smallest variant of structure 300 may have a vertical distance of 0.009 m between the lowest point of secondary trough 833 and the top point of one or more of peaks 832 and 834.

Further, the largest variant of structure 300 which may be implemented on a 3MW-class turbine may have a distance d' of 0.508 m, which is the vertical distance between the lowest point of primary trough 831 and the lowest point of secondary trough 833. The largest variant of structure 300 may also have a vertical distance of 0.034 m between the lowest point of secondary trough 833 and the top point of one or more of peaks 832 and 834.

Therefore, in the field trials, the ratio between (i) the vertical distance between the lowest point of secondary trough 833 and the top point of one or more of peaks 832 and 834; and (ii) the distance d', which is the vertical distance between the lowest point of primary trough 831 and the lowest point of secondary trough 833, was approximately in the range of 0.066 to 0.070, based on the smallest and largest variants of structure 300 (i.e., 0.009 m/0.13 m=0.0692; 0.034 m/0.508 m=0.0669).

The above described configurations of structures may be applicable in combination with one or more of the configurations disclosed in PCT published application no. PCT/CA2023/051565 filed on Nov. 22, 2023, entitled "STRUCTURE WITH SERRATIONS ADAPTED TO TRAVERSE A FLUID ENVIRONMENT", the contents of which are incorporated herein by reference, or in U.S. published application Ser. No. 15/501,461 filed on Aug. 5, 2015, entitled "STRUCTURE WITH RIGID PROJECTIONS ADAPTED TO TRAVERSE A FLUID ENVIRONMENT", the contents of which are incorporated herein by reference.

Applicant notes that the described embodiments and examples are illustrative and non-limiting. Practical implementation of the features may incorporate a combination of some or all of the aspects, and features described herein should not be taken as indications of future or existing product plans.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended embodiments are intended to include within their scope such processes, machines, manufacture, compositions of matter, means, methods, or steps.

As can be understood, the examples described above and illustrated are intended to be exemplary only.

What is claimed is:

1. A structure adapted to traverse a fluid environment, the structure comprising:

an elongate body having a length defined by a root to a wingtip, and a width defined by a leading edge to a trailing edge, the elongate body traversing a fluid;

a plurality of flexible projections, each of the flexible projections of the plurality of flexible projections having two peaks, a secondary trough between the two peaks and a primary trough between adjacent projections, and coupled to a respective position along the trailing edge and extending from a lowest point of the primary trough to a highest point of the two peaks to define a length of the flexible projection within the plurality of flexible projections;

a pressure side extending along a chord length of the elongate body from the leading edge to the trailing edge;

a suction side extending along the chord length of the elongate body from the leading edge to the trailing edge and opposing the pressure side, the pressure side and suction side generating a local median fluid pressure vector at the trailing edge;

wherein the plurality of flexible projections bend to form a curvature extending from the lowest point of the primary trough to the highest point of the two peaks which conforms to the local median fluid pressure vector at the trailing edge of the elongate body and directs mixing of the fluid within the primary and secondary trough; and wherein the following condition is true for the plurality of flexible projections:

$$\frac{k_p}{L_p^4} > \frac{k_b}{L_b^4}$$

where $k_p$ is the stiffness of the flexible projection, $L_p$ is the length of the flexible projection, $k_b$ is a stiffness of the elongate body, and $L_b$ is the chord length of the elongate body, such that a lowest resonant frequency of the plurality of flexible projections is above a lowest resonant frequency of the elongate body.

2. The structure of claim 1, wherein the plurality of flexible projections have a first resonant frequency above an oscillating force generated by the local median fluid pressure vector.

3. The structure of claim 1, wherein a distance (d') between a lowest point of the secondary trough and the lowest point of the one or more primary troughs between adjacent projections is between 5% and 45% of the chord length of the airfoil.

4. The structure of claim 3, wherein the distance (d') is determined based on a relation between a product of at least a speed of sound and a boundary displacement layer thickness, and a product of at least a constant and a total local wind speed.

5. The structure of claim 3, wherein the two or more peaks comprise only two peaks, and a width between the two peaks (w') is determined as a relation between at least d' and a dominant frequency to be reduced.

6. The structure of claim 5, wherein the dominant frequency is between 250 Hz-800 Hz.

7. The structure of claim 4, wherein d' is determined using the relation:

$$d' = \frac{U_s \partial_{BL}}{0.14\ U_L};$$

and wherein $U_s$ is determined based on an average operating temperature in a particular region of operation.

8. The structure of claim 5, wherein w' is determined using the relation:

$$w' = \frac{d' \times K}{\frac{f}{3}} \times 1000.$$

9. The structure of claim 1, wherein a thickness and stiffness of the flexible projection proximal to the trailing edge is greater than the thickness and the stiffness proximal to the highest point of the two peaks such that the flexible projection attenuates vibrations generated by turbulence within the local median fluid pressure vector.

10. The structure of claim 9, wherein the length of the plurality of flexible projections are 18%-20% of the chord length.

11. The structure of claim 1, further comprising two or more sections of flexible projections each extending along a portion of the length of the trailing edge, the flexible projections within each section of the two or more sections having at least one of a different length or geometry than the flexible projections within adjacent sections.

12. The structure of claim 1, wherein each of the flexible projections has an increased length relative to an adjacent flexible projection positioned closer to the wingtip of the elongate body.

13. The structure of claim 1, wherein the bending of the plurality of flexible projections is controlled by structural properties of the flexible projection including at least one of stiffness value, a material composition, the length and a geometry of the flexible projection.

14. The structure of claim 13, further comprising two or more sections of flexible projections each extending along a portion of the length of the trailing edge, the flexible projections within each section of the two or more sections having different structural properties.

15. The structure of claim 13, wherein each of the flexible projections has a higher stiffness value than an adjacent flexible projection positioned closer to the wingtip of the elongate body.

16. The structure of claim 13, wherein the flexible projection is composed of at least two material sections each extending along a portion of the length of the flexible projection, each material section containing a different material composition than an adjacent material section.

17. The structure of claim 1, wherein the length of the plurality of flexible projections are 5%-30% of the chord length.

18. The structure of claim 17, wherein the coupling of the flexible projection to the pressure or suction side occurs through at least a mechanical fastener, an adhesive, chemical bonding or a weld.

19. The structure of claim 1, wherein the flexible projection is integrated into the elongate body between the pressure and suction side of the trailing edge, and the flexible projection is securely coupled through at least one of an adhesive, a mechanical fasteners, a chemical bond, a tolerance fitting or a weld.

20. The structure of claim 1, wherein the flexible projection has a shore D hardness rating between 10-70 and a flexural strength between 100-500 MPa; the flexible projection extends past the trailing edge at an angle of (+/–) 10 degrees relative to the centerline of the base; and wherein the pressure gradient generated by the local median fluid pressure vector is between 1 MPa and 20 MPa.

* * * * *